Jan. 1, 1952 J. WICKS 2,580,709

TOLL SWITCHING TELEPHONE SYSTEM HAVING AUTOMATIC AMPLIFIER INSERTION AND GAIN SETTING

Filed Nov. 14, 1947 6 Sheets-Sheet 1

INVENTOR.
John Wicks
BY
Smith, Olsen & Baird
Attys.

Jan. 1, 1952 J. WICKS 2,580,709

TOLL SWITCHING TELEPHONE SYSTEM HAVING AUTOMATIC AMPLIFIER INSERTION AND GAIN SETTING

Filed Nov. 14, 1947 6 Sheets-Sheet 2

INVENTOR.
John Wicks
BY
Smith, Olsen & Baird
Attys

Jan. 1, 1952 J. WICKS 2,580,709

TOLL SWITCHING TELEPHONE SYSTEM HAVING AUTOMATIC AMPLIFIER INSERTION AND GAIN SETTING

Filed Nov. 14, 1947 6 Sheets-Sheet 3

INVENTOR.
John Wicks
BY
Smith, Olsen & Baird
Attys.

INVENTOR.
John Wicks
BY
Smith, Olsen & Baird
Attys.

INVENTOR.
John Wicks
BY
Smith, Olsen & Baird
Attys.

INVENTOR.
John Wicks
BY
Smith, Olsen & Baird
Attys.

Patented Jan. 1, 1952

2,580,709

UNITED STATES PATENT OFFICE 2,580,709

TOLL SWITCHING TELEPHONE SYSTEM HAVING AUTOMATIC AMPLIFIER INSERTION AND GAIN SETTING

John Wicks, Biloxi, Miss., assignor to Automatic Electric Laboratories, Inc., Chicago, Ill., a corporation of Delaware Application November 14, 1947, Serial No. 786,123

7 Claims. (Cl. 179—18)

The present invention relates to toll switching telephone systems and more particularly to such systems incorporating amplifiers for establishing the required signal intensities over the various lines and trunks involved in the toll connections.

It is an object of the present invention to provide an improved toll switching telephone system in which the toll connections are first set up by automatic switching apparatus and thereafter amplifiers are inserted into the toll connections in order to establish the required signal intensities over the various lines and trunks involved therein.

Another object of the invention is to provide an improved toll switching telephone system in which the number employed for setting automatic switching apparatus also sets the required signal gain of an associated amplifier appropriate to the two sections of the connection that are joined by the switching apparatus.

Another object of the invention is to provide an improved combination automatic switch and amplifier.

A further object of the invention is to provide in an automatic switch, an improved arrangement for inserting an amplifier incorporated therein between the incoming trunk and the switching mechanism thereof.

A further object of the invention is to provide in an automatic switch, an improved arrangement for selectively setting the switching mechanism thereof and for selectively setting a variable signal gain amplifier incorporated therein.

A still further object of the invention is to provide an automatic toll switching telephone system of the audio frequency dialing type wherein the toll operators in the various exchanges of the system complete the various toll connections utilizing directory numbers and wherein amplifiers and balancing networks are automatically selected and adjusted incident to operation of the automatic switches incorporated in the system.

Further features of the invention pertain to the particular arrangement of the circuit elements of the system, whereby the above-outlined and additional operating features thereof are attained.

*Sect. 1.—The general arrangement of the telephone system*

Figures 1, 7:
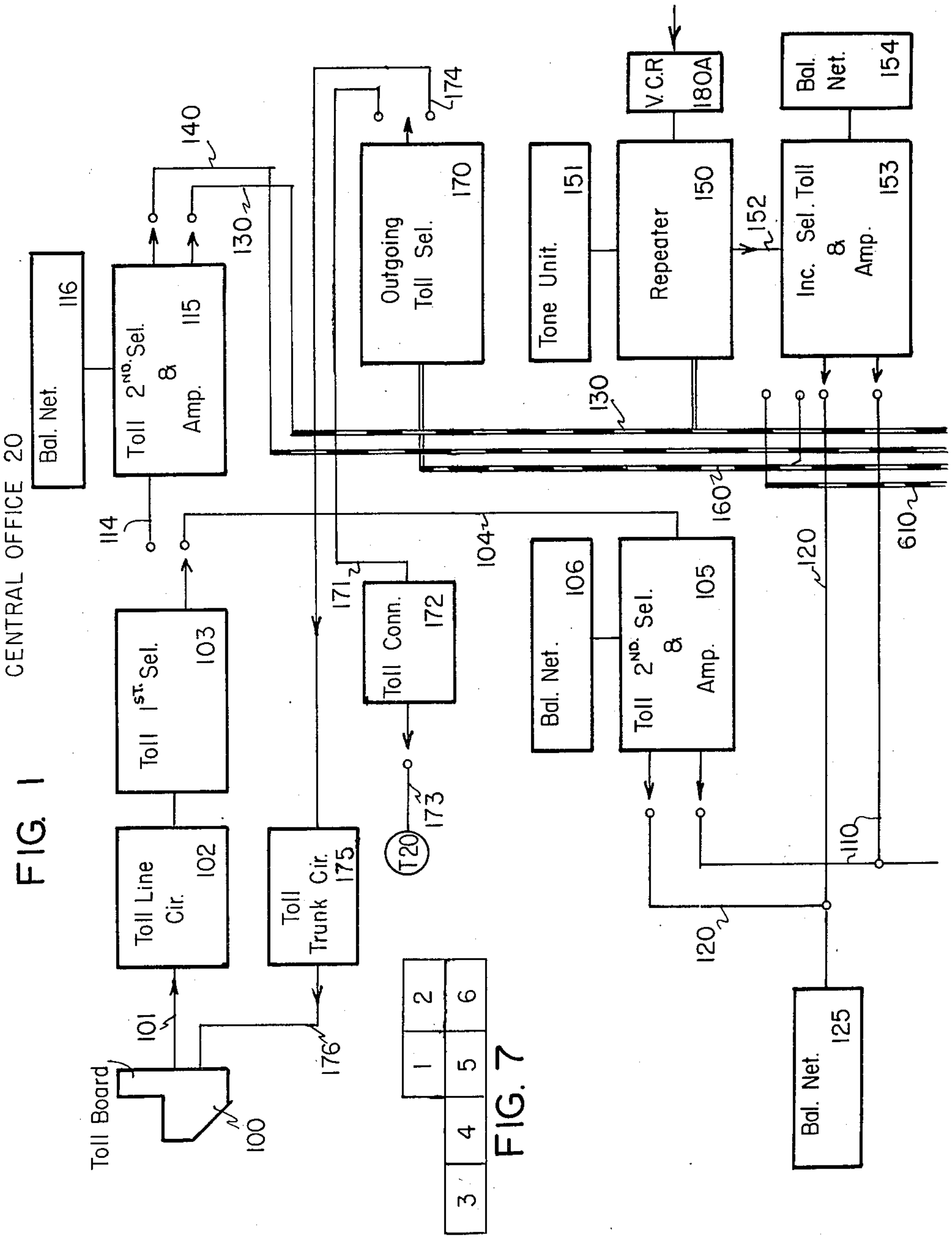
Figure 2:
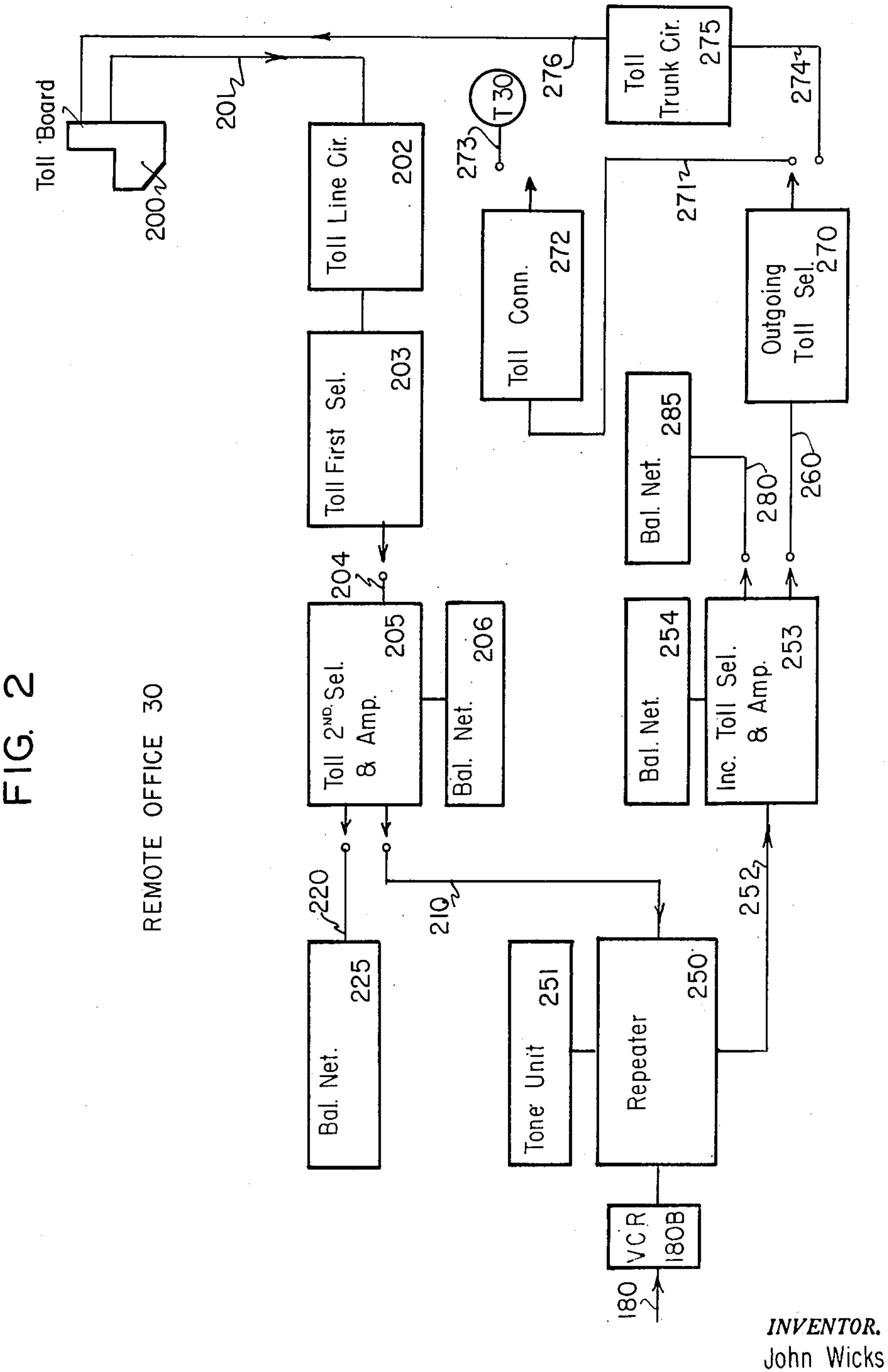

The invention, both as to its organization and method of operation, together with further objects and advantages thereof, will best be understood by reference to the following specification taken in connection with the accompanying drawings, in which Figures 1 to 6, inclusive, taken together, constitute a schematic diagram of the area served by a telephone system embodying the present invention and illustrates the details of certain of the apparatus incorporated in two different offices of the telephone system, which apparatus has incorporated therein, the features of the invention as briefly outlined above; and Fig. 7 illustrates the mode of combining Figs. 1 to 6, inclusive, to form a unified diagram.

Figure 3:
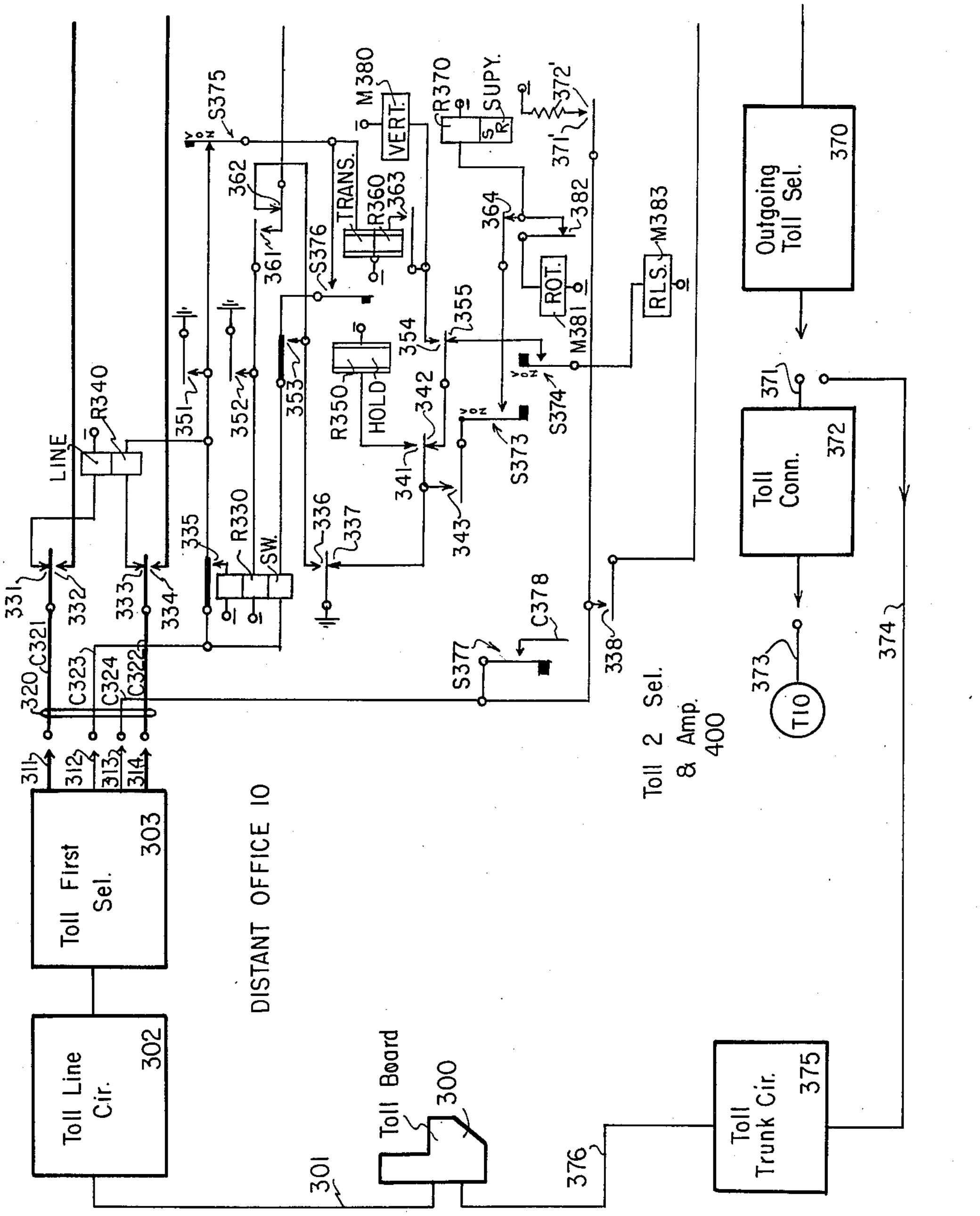
Figure 4:
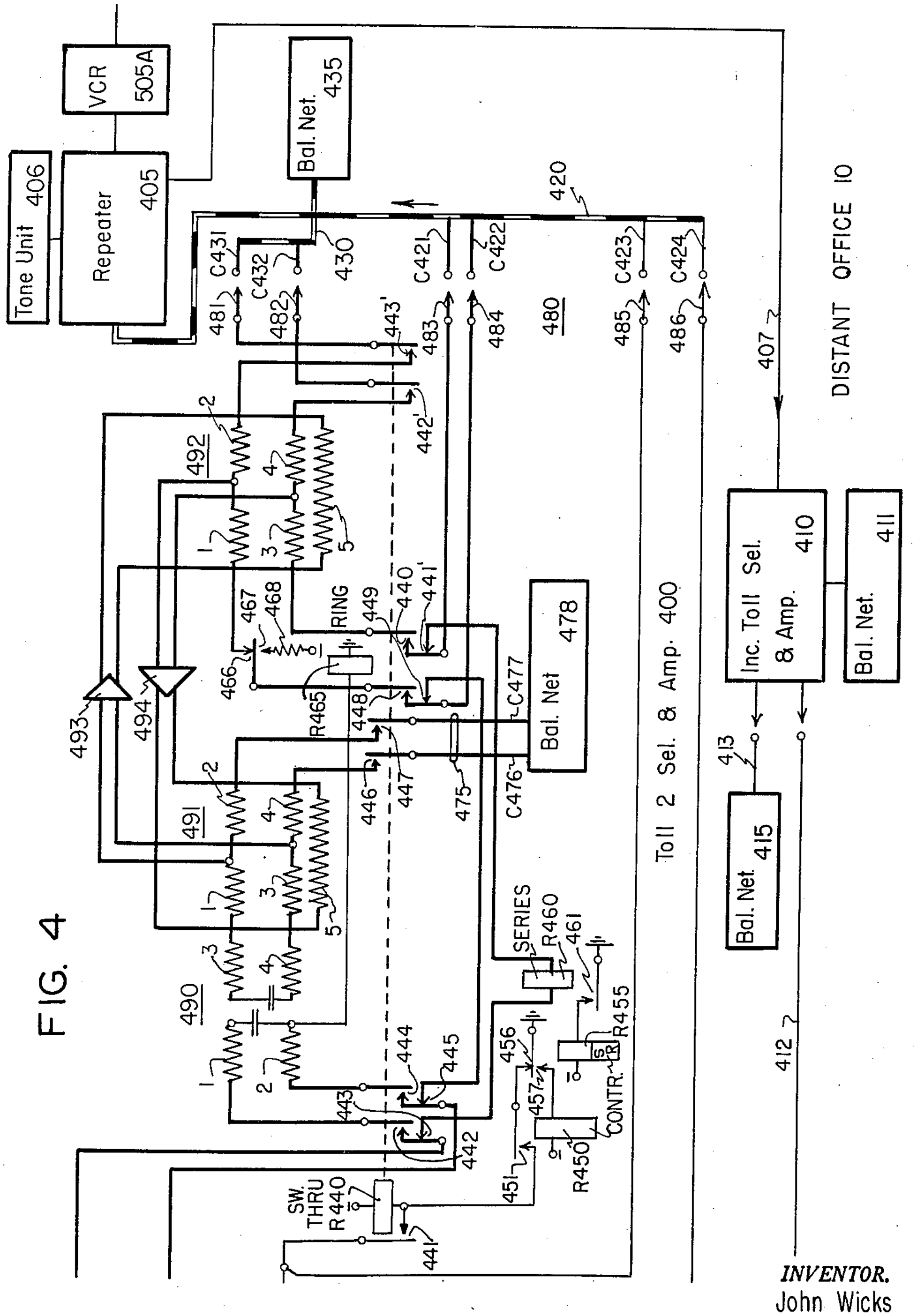
Figure 5:
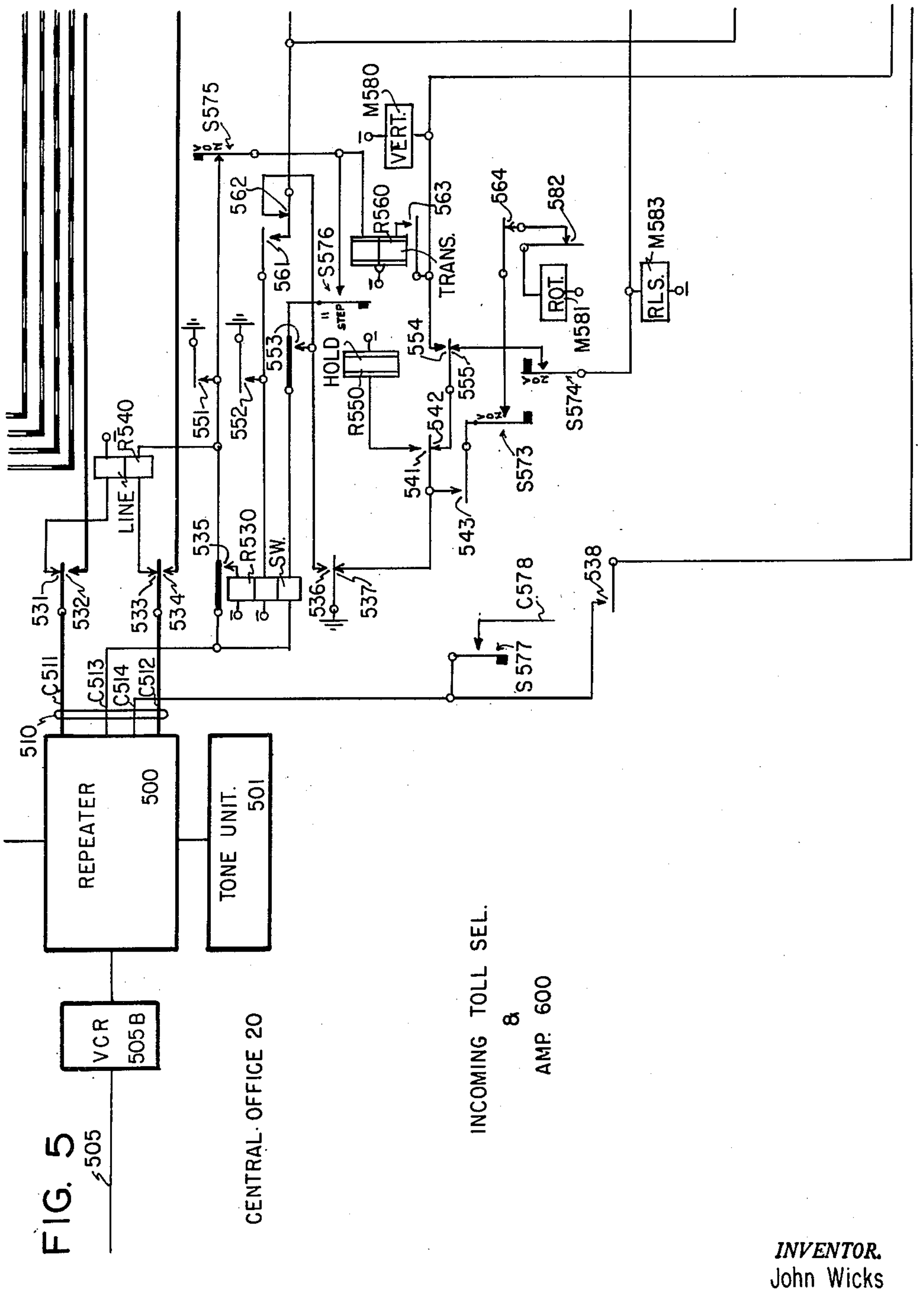
Figure 6:
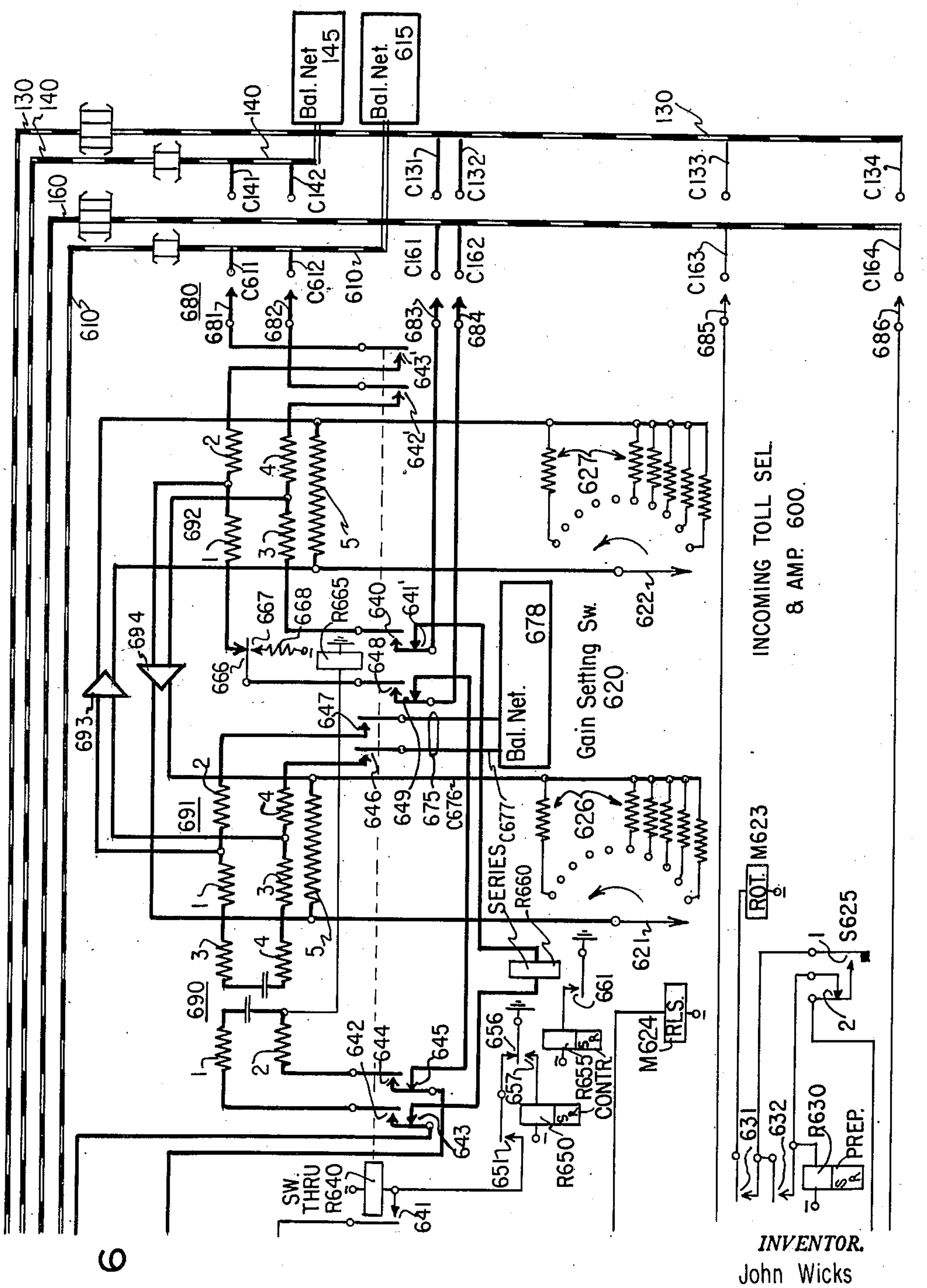

More particularly, Figs. 3 and 4 illustrate the details of one of the toll second selectors and amplifiers incorporated in the distant office; and Figs. 5 and 6 illustrate the details of one of the incoming toll selectors and amplifiers incorporated in the central office.

Referring now more particularly to Figs. 1 to 6, inclusive, of the drawings, the telephone system there illustrated serves an area comprising a distant office 10, a central office 20 and a remote office 30. The distant office 10 is of the automatic type, serving a number of subscriber substations, including the subscriber substation T10, and comprises a toll board 300 of the manual dial type, as well as automatic switching apparatus. Similarly, the central office 20 is of the automatic type, serving a number of subscriber substations, including the subscriber substation T20, and comprises a toll board 100 of the manual dial type, as well as automatic switching apparatus. Likewise, the remote office 30 is of the automatic type, serving a number of subscriber substations, including the subscriber substation T30, and comprises a toll board 200 of the manual dial type, as well as automatic switching apparatus.

The distant office 10 and central office 20 are interconnected by a group of toll lines, including the toll line 505; the toll line 505 incorporating a number of voice current repeaters 505A, 505B, etc., of the vacuum tube type distributed therealong and terminating in repeaters 405 and 500 respectively disposed in the distant office 10 and in the central office 20. Similarly, the central office 20 and the remote office 30 are interconnected by a group of toll lines, including the toll line 180; the toll line 180 incorporating a number of voice current repeaters 180A, 180B, etc., of the vacuum tube type distributed therealong and terminating in repeaters 150 and 250 respectively disposed in the central office 20 and in the remote office 30.

The distant office 10 comprises a local switch train, not shown, for setting up connections to and from the subscriber substations T10, etc.;

as well as a toll switch train, including a group of incoming toll selectors and amplifiers 410, etc., individually associated with the repeaters 405, etc.; the incoming toll selector and amplifier 410 being individually connected to the repeater 405 by an outgoing trunk 407. Also the repeaters 405, etc., are provided with individually associated tone units 406, etc.; and the incoming toll selectors and amplifiers 410, etc., are provided with individually associated balancing networks 411, etc. Also the toll switch train comprises a plurality of groups of outgoing toll selectors, one of the groups including the outgoing toll selector 370. The outgoing toll selectors 370, etc., are accessible via trunks 412, etc., to the incoming toll selectors and amplifiers 410, etc., and are provided with individually associated balancing networks 415, etc., also accessible via trunks 413, etc., to the incoming toll selectors and amplifiers 410, etc. Further the toll switch train comprises a plurality of groups of toll connectors, one of the groups including the toll connector 372. The toll connectors 372, etc., are accessible via trunks 371, etc., to the outgoing toll selectors 370, etc.; and, in turn, have access to the subscriber lines 373, etc., respectively extending to the subscriber substations T10, etc., in the associated group. Also the toll switch train comprises a group of toll trunk circuits 375, etc. The toll trunk circuits 375, etc., are accessible via trunks 374, etc., to the outgoing toll selectors 370, etc., and are connected via trunks 376, etc., terminating jacks, not shown, disposed at the toll board 300. Further the toll switch train comprises a group of toll first selectors 303, etc., provided with individually associated toll line circuits 302, etc., terminating trunks 301, etc., that terminate in jacks, not shown, disposed at the toll board 300. Further the toll switch train comprises a group of toll second selectors and amplifiers 400, etc., provided with individually associated balancing networks 478, etc., and accessible via trunks 320, etc., to the toll first selectors 303, etc. The toll second selectors and amplifiers 400, etc., have access via incoming trunks 420, etc., to the repeaters 405, etc. Also the repeaters 405, etc., are provided with individually associated balancing networks 435, etc., accessible via trunks 430, etc., to the toll second selectors and amplifiers 400, etc.

The central office 20 comprises a local switch train, not shown, for setting up connections to and from the subscriber substations T20, etc.; as well as a toll switch train, including first and second groups of incoming toll selectors and amplifiers respectively associated with the first and second groups of repeaters. The first group of incoming toll selectors and amplifiers includes the incoming toll selector and amplifier 600 individually associated with the repeater 500 in the first group; the incoming toll selector and amplifier 600 being individually connected to the repeater 500 by an outgoing trunk 510. The second group of incoming toll selectors and amplifiers includes the incoming toll selector and amplifier 153 individually associated with the repeater 150 in the second group; the incoming toll selector and amplifier 153 being individually connected to the repeater 150 by an outgoing trunk 152. Also the repeaters 500, etc., in the first group are provided with individually associated tone units 501, etc.; and the repeaters 150, etc., in the second group are provided with individually associated tone units 151, etc. The incoming toll selectors and amplifiers 600, etc., in the first group are provided with individually associated balancing networks 678, etc., and the incoming toll selectors and amplifiers 153, etc., in the second group are provided with individually associated balancing networks 154, etc. Also the toll switch train comprises a plurality of groups of outgoing toll selectors, one of the groups including the outgoing toll selector 170. The outgoing toll selector 170, etc., are accessible via trunks 160, etc., to the incoming toll selectors and amplifiers 600, etc., in the first group and to the incoming toll selectors and amplifiers 153, etc., in the second group, and are provided with individually associated balancing networks 615, etc., also accessible via trunks 610, etc., to the incoming toll selectors and amplifiers 600, etc., in the first group and to the incoming toll selectors and amplifiers 153, etc., in the second group. Further, the toll switch train comprises a plurality of groups of toll connectors, one of the groups including the toll connector 172. The toll connectors 172, etc., are accessible via trunks 171, etc., to the outgoing toll selectors 170, etc., and, in turn, have access to the subscriber line 173, etc., respectively extending to the subscriber substations T20, etc., in the associated group. Also the toll switch train comprises a group of toll trunk circuits 175, etc. The toll trunk circuits 175, etc., are accessible via trunks 174, etc., to the outgoing toll selectors 170, etc., and are connected via trunks 176, etc., to terminating jacks, not shown, disposed at the toll board 100. Further the toll switch train comprises a group of toll first selectors 103, etc., provided with individually associated toll line circuits 102, etc., terminating trunks 101, etc., that terminate in jacks, not shown, disposed at the toll board 100. Further the toll switch train comprises a first group of toll second selectors and amplifiers 105, etc., provided with individually associated balancing networks 106, etc., and accessible via trunks 104, etc., to the toll first selectors 103, etc. The toll second selectors and amplifiers 105, etc., have access via trunks 110, etc., to the repeaters 500, etc., in the first group. Also the repeaters 500, etc., are provided with individually associated balancing networks 125, etc., accessible via trunks 120, etc., to the toll second selectors and amplifiers 105, etc., in the first group. Further, the toll switch train comprises a second group of toll second selectors and amplifiers 115, etc., provided with individually associated balancing networks 116, etc., and accessible via trunks 114, etc., to the toll first selectors 103, etc. The toll second selectors and amplifiers 115, etc., have access via incoming trunks 130, etc., to the repeaters 150, etc., in the second group. Also the repeaters 150, etc., are provided with individually associated balancing networks 145, etc., accessible via trunks 140, etc., to the toll second selectors and amplifiers 115, etc., in the second group. Moreover, the incoming toll selectors and amplifiers 600, etc., in the first group have access via the incoming trunks 130, etc., to the repeaters 150, etc., in the second group and to the balancing networks 145, etc., via the trunks 140, etc. Similarly, the incoming toll selectors and amplifiers 153, etc., in the second group have access via the trunks 110, etc., to the repeaters 500, etc., in the first group and to the balancing networks 125, etc., via the trunks 120, etc.

The remote office 30 comprises a local switch train, not shown, for setting up connections to and from the subscriber substations T30, etc.; as well as a toll switch train, including a group of incoming toll selectors and amplifiers 253, etc., individually associated with the repeaters 250, etc., the incoming toll selector and amplifier 253 being individually connected to the repeater 250 by an outgoing trunk 252. Also the repeaters 250, etc., are provided with individually associated tone units 251, etc.; and the incoming toll selectors and amplifiers 253, etc., are provided with individually associated balancing networks 254, etc. Also the toll switch train comprises a plurality of groups of outgoing toll selectors, one of the groups including the outgoing toll selector 270. The outgoing toll selectors 270, etc., are accessible via trunks 260, etc., to the incoming toll selectors and amplifiers 253, etc., and are provided with individually associated networks 285, etc., also accessible via trunks 280, etc., to the incoming toll selectors and amplifiers 253, etc. Further the toll switch train comprises a plurality of groups of toll connectors, one of the groups including the toll connector 272. The toll connectors 272, etc., are accessible via trunks 271, etc., to the outgoing toll selectors 270, etc.; and, in turn, have access to the subscriber lines 273, etc., respectively extending to the subscriber substations T30, etc., in the associated group. Also the toll switch train comprises a group of toll trunk circuits 275, etc. The toll trunk circuits 275, etc., are accessible via trunks 274, etc., to the outgoing toll selectors 270, etc., and are connected via trunks 276, etc., to terminating jacks, not shown, disposed at the toll board 200. Further, the toll switch train comprises a group of toll first selectors 203, etc., provided with individually associated toll line circuits 202, etc., terminating trunks 201, etc., that terminate in jacks, not shown, disposed at the toll board 200. Further the toll switch train comprises a group of toll second selectors and amplifiers 205, etc., provided with individually associated balancing networks 206, etc., and accessible via trunks 204, etc., to the toll first selectors 203, etc. The toll second selectors and amplifiers 205, etc., have access via incoming trunks 210, etc., to the repeaters 250, etc. Also the repeaters 250, etc., are provided with individually associated balancing networks 225, etc., accessible via trunks 220, etc., to the toll second selectors and amplifiers 205, etc.

*Sect. 2.—The apparatus incorporated in the telephone system*

In the several offices, the subscriber substations T10, T20, T30, etc., are provided with conventional substation apparatus; the subscriber lines 373, 173, 273, etc., are provided with conventional line circuits, not shown, and the local switch trains, not shown, are of the conventional Strowger type. Also the toll boards 300, 100 and 200 are of the conventional manual dial type, including cord circuits, not shown; the toll line circuits 302, 102, 202, etc., are of any conventional type; the toll first selectors 303, 103, 203 etc., of the conventional Strowger type; the toll trunk circuits 375, 175, 275, etc., are of any conventional type; the outgoing toll selectors 370, 170, 270, etc., are of the conventional Strowger type; and the toll connectors 372, 172, 272, etc., are of the conventional Strowger type.

The toll second selectors and amplifiers 400, 105, 115, 205, etc., are identical; the toll second selector and amplifier 400 comprises, as shown in Figs. 3 and 4, a relay group including a switch relay R330, a line relay R340, a hold relay R350, a transfer relay R360, a supervisory relay R370, a switch-through relay R440, two control relays R450 and R455, a series relay R460 and a ring relay R465. Also the toll second selector and amplifier 400 comprises a Strowger mechanism 480 having six individual wipers 481 to 486, inclusive, provided with an associated contact bank, a vertical magnet M380 for driving the wiper carriage step by step in the vertical direction away from its normal vertical position, a rotary magnet M381 for driving the wiper carriage step by step in the rotary direction away from its normal rotary position and a release magnet M383 for releasing the wiper carriage and for returning it to its normal rotary and vertical positions. Also associated with the wiper carriage of the Strowger mechanism 480 are three sets of switch springs S373, S374 and S375 that are operated when the wiper carriage is driven one step in the vertical direction away from its normal vertical position, and two sets of switch springs S376 and S377 that are operated when the wiper carriage is driven eleven steps in the rotary direction away from its normal rotary position. Further the toll second selector and amplifier 400 comprises a repeating coil 490, two transformers 491 and 492, and two one-way amplifiers 493 and 494 of the vacuum tube type.

The incoming toll selectors and amplifiers 410, 600, 153, 253, etc., are identical; the incoming toll selector and amplifier comprises, as shown in Figs. 5 and 6, a relay group including a switch relay R530, a line relay R540, a hold relay R550, a transfer relay R560, a prepare relay R630, a switch-through relay R640, two control relays R650 and R655, a series relay R660 and a ring relay R665. Also the incoming toll selector and amplifier 600 comprises a Strowger mechanism 680 having six individual wipers 681 to 686, inclusive, provided with an associated contact bank, a vertical magnet M580 for driving the wiper carriage step by step in the vertical direction away from its normal vertical position, a rotary magnet M581 for driving the wiper carriage step by step in the rotary direction away from its normal rotary position and a release magnet M583 for releasing the wiper carriage and for returning it to its normal rotary and vertical positions. Also associated with the wiper carriage of the Strowger mechanism 580 are three sets of switch springs S573, S574 and S575 that are operated when the wiper carriage is driven one step in the vertical direction away from its normal vertical position, and two sets of switch springs S576 and S577 that are operated when the wiper carriage is driven eleven steps in the rotary direction away from its normal rotary position. Further the incoming toll selector and amplifier 600 comprises a repeating coil 690, two transformers 691 and 692, and two one-way amplifiers 693 and 694 of the vacuum tube type.

Further the incoming toll selector and amplifier 600 comprises a gain setting switch 620 of the minor type, including two individual wipers 621 and 622 provided with associated contact banks, a rotary magnet M623 for driving the wipers noted step by step in the counterclockwise direction, and a release magnet M624 for releasing the wipers noted and for returning them to their normal rotary positions. Also associated with the wipers 621 and 622 of the gain setting switch 620 is a set of switch springs S625 that is operated when the wipers noted are driven one step in the counterclockwise direction away from their normal rotary positions.

The repeaters 405, 500, 150, 250, etc., are identical and of the connection and arrangement of the repeater 400 disclosed in the copending application of John Wicks and Otho D. Grandstaff, Serial No. 749,758, filed May 22, 1947, now Patent No. 2,517,516, granted August 1, 1950. Specifically, the repeater 400 disclosed in Figs. 4, 5 and 6 of the Wicks and Grandstaff application mentioned comprises a relay network.

The tone units 406, 501, 151, 251, etc., are identical and of the connection and arrangement of the tone unit 100 disclosed in the copending application of Otho D. Grandstaff, Serial No. 738,194, filed March 29, 1947. Specifically, the tone unit 100 disclosed in the single figure of the Grandstaff application mentioned comprises a relay and vacuum tube network, and is capable both of generating and of receiving 60 cycle modulated 1000 cycle current and unmodulated 1000 cycle current, and also of amplifying ordinary audio signals received over the associated toll line and for impressing the amplified audio signals on the associated incoming trunk for monitoring purposes.

The voice current repeaters 505A, 505B, 180A, 180B, etc., incorporated in the toll lines 505, 180, etc., are of any suitable vacuum tube type. The balancing networks 411, 678, 154, 254, etc., individually associated with the incoming toll selectors and amplifiers 410, 600, 153, 253, etc., are of conventional form; the balancing networks 478, 106, 116, 206, etc., individually associated with the toll second selectors and amplifiers 400, 105, 115, 205, etc., are of conventional form; and the balancing networks 415, 435, 615, 145, 125, 225, and 285, accessible to the various toll second selectors and amplifiers 400, etc., and to the various incoming toll selectors and amplifiers 410, etc., are of conventional form.

More particularly, the balancing network 411 is individually associated with the incoming toll selector and amplifier 410 and is arranged to balance the toll line 505 via the outgoing trunk 407 and the terminating repeater 405; likewise the balancing network 678 is individually associated with the incoming toll selector and amplifier 600 and is arranged to balance the toll line 505 via the outgoing trunk 510 and the terminating repeater 500. Similarly, the balancing network 154 is individually associated with the incoming toll selector and amplifier 153 and is arranged to balance the toll line 180 via the outgoing trunk 152 and the terminating repeater 150; likewise, the balancing network 254 is individually associated with the incoming toll selector and amplifier 253 and is arranged to balance the toll line 180 via the outgoing trunk 252 and the terminating repeater 250.

The balancing network 435 is individually paired with the terminating repeater 405 and is selected via the trunk 430 when the repeater 405 is selected via the incoming trunk 420 by the toll second selector and amplifier 400, etc., and is arranged to balance the toll line 505; likewise, the balancing network 125 is individually paired with the terminating repeater 500 and is selected via the trunk 120 when the repeater 500 is selected via the incoming trunk 110 by the toll second selector and amplifier 105, etc., in the first group and by the incoming toll selector and amplifier 153, etc., in the second group, and is arranged to balance the toll line 505. Similarly, the balancing network 225 is individually paired with the terminating repeater 250 and is selected via the trunk 220 when the repeater 250 is selected via the incoming trunk 210 by the toll second selector and amplifier 250, etc., and is arranged to balance the toll line 180; likewise, the balancing network 145 is individually paired with the terminating repeater 150 and is selected via the trunk 140 when the repeater 150 is selected via the incoming trunk 130 by the toll second selector and amplifier 115, etc., in the second group and by the incoming toll selector and amplifier 600, etc., in the first group, and is arranged to balance the toll line 180.

The balancing network 415 is paired with the outgoing toll selector 370 and is selected via the trunk 413 when the outgoing toll selector 370 is selected via the incoming trunk 412 by the incoming toll selector and amplifier 410, etc., and is arranged to balance a local connection in the distant office 10 either to a subscriber substation T10, etc., or to the toll board 300 therein. Likewise, the balancing network 615 is paired with the outgoing toll selector 170 and is selected via the trunk 610 when the outgoing toll selector 170 is selected via the trunk 160 by the incoming toll selector and amplifier 600, 153, etc., and is arranged to balance a local connection in the central office 20 either to a subscriber substation T20, etc., or to the toll board 100 therein. Similarly, the balancing network 285 is paired with the outgoing toll selector 270 and is selected via the trunk 280 when the outgoing toll selector 270 is selected via the incoming trunk 260 by the incoming toll selector and amplifier 253, etc., and is arranged to balance a local connection in the remote office 30 either to a subscriber substation T30, etc., or to the toll board 200 therein.

The toll second selectors and amplifiers 400, 105, etc., have fixed gain settings therein to accommodate the attenuations of the local connections in the offices 10 and 20 and of the toll lines 505, etc., extending between the offices mentioned. Likewise, the toll second selectors and amplifiers 205, 115, etc., have fixed gain settings therein to accommodate the attenuations of local connections in the offices 30 and 20 and of the toll lines 180, etc., extending between the offices mentioned. The incoming toll selectors and amplifiers 600, etc., comprise a gain setting therein to accommodate the attenuation of the toll line 505, etc., and first and second selectable gain settings respectively corresponding to the attenuation of a local connection to a subscriber substation T20, etc., or to the toll board 100 in the central office 20 and to the attenuation of the toll lines 180, etc., extending between the central office 20 and the remote office 30; likewise, the incoming toll selectors and amplifiers 153, etc., comprise a gain setting therein to accommodate the attenuation of the toll lines 180, etc., and first and second selectible gain settings respectively corresponding to the attenuation of a local connection to a subscriber substation T20, etc., or to the toll board 100 in the central office 20 and to the attenuation of the toll lines 505, etc., extending between the distant office 10 and the central office 20.

A better understanding of the connection and arrangement of the apparatus incorporated in the telephone system will be facilitated from a consideration of the extension of calls involving the various offices thereof.

*Sect. 3.—Extension of a call from the toll board in the distant office to a subscriber substation in the central office*

Assuming that a toll call is to be extended from the toll board 300 in the distant office 10 to a subscriber substation, such for example, as the subscriber substation T20 in the central office 20, the operator at the toll board 300 selects an idle cord circuit and inserts the front plug thereof into the jack terminating an idle one of the trunks in the group, including the trunk 301. For example, the trunk 301 may be thus selected; whereby the associated toll line circuit 302 operates to effect seizure of the associated toll first selector 303. The operator at the toll board 300 then dials a predetermined first digit in order to effect operation of the toll first selector 303; whereby the toll first selector 303 selects the corresponding group of trunks, including the trunk 320, and then an idle trunk in the selected group. For example, the toll first selector 303 may select the particular trunk 320 extending to the toll second selector and amplifier 400, the trunk 320 being marked as idle to the toll first selector 303 by the application of battery potential to the control conductor C323 thereof, via the set of switch springs S375 and the upper winding of the transfer relay R360. When the toll first selector 303 selects the idle trunk 320, it switches through whereby ground potential therein is applied to the control wiper 312 thereof and consequently to the control conductor C323 of the trunk 320 in order to complete a circuit substantially identical to that previously traced for operating the transfer relay R360. Also the application of ground potential upon the control conductor C323 of the trunk 320 completes a circuit, including the contacts 333 and 331, and the line conductors C322 and C321 of the trunk 320, for energizing in series the upper and lower windings of the line relay R340 in order to cause the latter relay to operate. Upon operating the line relay R340 completes, at the contacts 341, a circuit, including the contacts 337, for operating the hold relay R350. Upon operating the hold relay R350 completes, at the contacts 351, a direct path for applying ground potential to the control conductor C323 of the trunk 320, thereby to complete a multiple holding circuit for energizing the upper winding of the transfer relay R360 and a direct loop circuit for energizing in series the upper and lower windings of the line relay R340 from the toll board 300 via the connection, including the line conductors C321 and C322 of the trunk 320, the toll first selector 303, the toll line circuit 302 and the trunk 301. Also upon operating the hold relay R350 completes, at the contacts 352, a circuit for energizing the intermediate winding of the switch relay R330 in order to render the latter relay fast to operate when the lower winding thereof is subsequently energized. Further the hold relay R350 prepares, at the contacts 353, a point in a circuit traced hereinafter for energizing the lower winding of the switch relay R330; and prepares, at the contacts 354, a point in a multiple circuit traced hereinafter for energizing the lower winding of the transfer relay R360 and for operating the vertical magnet M380. At this time the toll first selector 303 has operated to seize the trunk 320 extending to the toll second selector and amplifier 400 and the toll second selector and amplifier 400 is conditioned to be responsive to the second digit dialed at the toll board 300. Also the application of ground potential to the control conductor C323 of the trunk 320 marks the trunk 320 as busy to the other toll first selectors having access thereto.

The operator at the toll board 300 then proceeds to dial a predetermined second digit; whereby the line relay R340 follows over the loop circuit. Each time the line relay R340 restores and then reoperates, it interrupts, and then recompletes, at the contacts 341, the circuit for energizing the winding of the hold relay R350; whereby the latter relay, being of the slow-to-release type, remains operated during impulsing. Also each time the line relay R340 restores and then reoperates, it completes and then interrupts, at the contacts 342, a circuit, including the contacts 337, 354 and 363, for energizing the lower winding of the transfer relay R360 in order to retain the latter relay in its operated position during impulsing, as it is of the slow-to-release type. Further, each time the line relay R340 restores and then reoperates, it completes and then interrupts, at the contacts 342, a multiple circuit, including the contacts 337 and 354, for operating the vertical magnet M380; whereby the wiper carriage of the Strowger mechanism 480 is driven a corresponding number of steps in the vertical direction away from its normal vertical position. When the wiper carriage of the Strowger mechanism 480 is driven one step in the vertical direction away from its normal vertical position, the sets of switch springs S373, S374 and S375 are operated. More particularly the set of switch springs S375 is operated in order to interrupt the circuit for energizing the upper winding of the transfer relay R360; and the set of switch springs S373 is operated in order to prepare a circuit traced hereinafter for operating the rotary magnet M381.

At the conclusion of the second digit mentioned, the line relay R340 is retained in its operated position and shortly thereafter, the transfer relay R360 restores, it being of the slow-to-release type. Also at this time the wiper carriage of the Strowger mechanism 480 has selected the group of trunks, including the trunk 420 extending to the repeater 405 terminating the toll line 505 extending between the distant office 10 and the central office 20. Upon restoring the transfer relay R360 completes, at the contacts 364, a path, including the contacts 337 and 343 and the set of switch springs S373, for operating the supervisory relay R370. Upon operating the supervisory relay R370 completes, at the contacts 371', a path for applying battery potential by way of the resistor 372' to the EC conductor C324 of the trunk 320, thereby to illuminate the front supervisory lamp associated with the cord circuit in use at the toll board 300 in order to indicate to the operator thereat that the third digit should not be dialed at this time since the toll second selector and amplifier 400 is proceeding with the selection of an idle toll line extending between the distant office 10 and the central office 20. Also upon restoring the transfer relay R360 completes, at the contacts 364, a multiple circuit, including the contacts 337, 343 and 382, and the set of switch springs S373, for operating the rotary magnet M381; whereby the rotary magnet M381 upon operating interrupts, at the contacts 382, the operating circuit therefor and drives the wipers noted of the Strowger mechanism 480 one step in the rotary direction away from their normal rotary positions. At this time the switch relay R330 tests the idle or busy condition of the first trunk in the group, including the trunk 420, ground potential appearing upon the control conductor thereof in the event the selected trunk mentioned is busy completing a path, including the control wiper 485 of the Strowger mechanism 480, the contacts 362, 353 and 351, for short-circuiting the lower winding of the switch relay R330. Assuming that the selected first trunk mentioned is busy at this time, the rotary magnet M381 then restores in order to recomplete, at the contacts 382, the operating circuit thereof; whereby the rotary magnet M381 reoperates in order to interrupt, at the contacts 382, the operating circuit therefor; whereby the rotary magnet M381 reoperates in order again to interrupt, at the contacts 382, the operating circuit therefor and to drive the wiper carriage of the Strowger mechanism 480 an additional step in the rotary direction selecting the second trunk in the group, including the trunk 420. Accordingly, the rotary magnet M381 operates buzzer fashion; whereby the wiper carriage of the Strowger mechanism 480 is driven step by step in the rotary direction and the corresponding selected trunks are tested.

Assuming that the trunk 420 is the first idle trunk in the selected group, when it is selected by the wiper set of the Strowger mechanism 480, battery potential appearing upon the control conductor C423 thereof completes a circuit substantially identical to that previously traced for energizing the lower winding of the switch relay R330 in order to cause the latter relay to operate exceedingly fast, it being polarized as a consequence of the previous energization of the intermediate winding thereof. Upon operating the switch relay R330 interrupts, at the contacts 337, the multiple circuits for operating the rotary magnet M381 and for energizing the windings of the hold relay R350 and the supervisory relay R370, thereby to arrest further operation of the rotary magnet M381 and to cause the hold relay R350 and the supervisory relay R370 to restore shortly thereafter, the relays mentioned being of the slow-to-release type. Also the switch relay R330 completes, at the contacts 335, a holding circuit, including the grounded control conductor C323 of the trunk 320, for energizing the upper winding thereof; and completes, at the contacts 336, a direct path, including the contacts 362, for applying ground potential to the control wiper 485 of the Strowger mechanism 480 and consequently to the control conductor C423 of the trunk 420 extending to the repeater 405. Further the switch relay R330 interrupts, at the contacts 331, and 333, the loop circuit extending from the toll board 300 to the upper and lower windings of the line relay R340; and completes, at the contacts 332 and 334, a connection, including the contacts 443, 445 and 441', 449 between the line conductors C321 and C322 of the trunk 320 and the line wipers 483 and 484 of the Strowger mechanism 480; which connection includes the winding of the series relay R460 and is extended via the line conductors C421 and C422 of the trunk 420 to the line relay in the repeater 405. Accordingly, at this time the toll second selector and amplifier 400 has operated to seize the trunk 420 extending to the repeater 405; whereby the loop circuit from the toll board 300 is extended via the trunk 301, the toll line circuit 302, the toll first selector 303, the trunk 320, the toll second selector and amplifier 400 and the trunk 420 to the line relay in the repeater 405. Accordingly, the repeater 405 is seized and operates in conjunction with the associated tone unit 406 in a manner more fully explained hereinafter. When the switch relay R330 interrupts, at the contacts 331 and 333, the original loop circuit extending to the upper and lower windings of the line relay R340, the latter relay restores. Upon restoring the hold relay R350 interrupts, at the contacts 351, the previously mentioned path for applying ground potential in the toll second selector and amplifier 400 to the control conductor C323 of the trunk 320; however, without effect, since ground potential in the toll first selector 303 is retained upon the associated control wiper 312 and consequently upon the control conductor C323 of the trunk 320 in order to retain operated the switch relay R330 in the toll second selector and amplifier 400. Also upon restoring the hold relay R350 interrupts, at the contacts 353, the original operating circuit for energizing the lower winding of the switch relay R330; and interrupts, at the contacts 352, the circuit for energizing the intermediate winding of the switch relay R330; however, without effect, since the holding circuit for energizing the upper winding of the switch relay R330 is completed at this time as previously noted. Upon restoring the supervisory relay R370 interrupts, at the contacts 371', the original path for applying battery potential by way of the resistor 312' to the EC conductor C324 of the trunk 320; however, upon operating the switch relay R330 completed, at the contacts 338, a connection between the EC conductor C324 of the trunk 320 and the EC wiper 486 of the Strowger mechanism 480 and consequently the EC conductor C424 of the trunk 420; whereby battery potential in the repeater 405 is applied to the EC conductor C424 of the trunk 420 in order to retain illuminated the front supervisory lamp associated with the cord circuit in use at the toll board 300, thereby to continue the caution to the operator at the toll board 300 not to dial the third digit at this time. Also the operated switch relay R330 retaining ground potential upon the control wiper 485 of the Strowger mechanism 480 and consequently upon the control conductor C423 of the trunk 420, marks the trunk 420 as busy to the other toll second selectors and amplifiers having access thereto. As previously noted, the trunk 430 extending to the balancing network 435 is paired with the incoming trunk 420 extending to the repeater 405; whereby the wipers 481 and 482 of the Strowger mechanism 480 select the line conductors C431 and C432 of the trunk 430 when the wipers 483 and 484 of the Strowger mechanism 480 select the line conductors C421 and C422 of the trunk 420; the balancing network 435 being arranged to balance the toll line 505 extending between the distant office 10 and the central office 20. Also it is noted that the winding of the series relay R460 in the toll second selector and amplifier 400 is energized over the loop circuit extending between the toll board 300 and the line relay in the repeater 405; whereby the series relay R460 operates. Upon operating the series relay R460 completes, at the contacts 461, a circuit for operating the control relay R455; and upon operating the control relay R455 completes, at the contacts 457, a circuit for operating the control relay R450.

When the toll second selector and amplifier 400 is operated in the manner previously explained to seize the trunk 420 extending to the repeater 405, the repeater 405 operates in conjunction with the associated tone unit 406 to transmit a short splash of 60 cycle modulated 1000 cycle current over the toll line 505, and constituting a seizure signal; and also to return during the transmission of the seizure signal battery potential over the EC conductor C424 of the trunk 420. At the conclusion of the seizure signal the repeater 405 and the associated tone unit 406 are conditioned to be receptive to a digit transmitted from the toll board 300; and the repeater 405 operates to interrupt the return of battery potential over the EC conductor C424 of the trunk 420; whereby the front supervisory lamp associated with the cord circuit in use at the toll board 300 is extinguished in order to indicate to the operator thereat that she may proceed to dial the third digit. The seizure signal transmitted over the toll line 505 is received by the repeater 500 and the associated tone unit 501; whereby the repeater 500 operates to seize the incoming toll selector 600 over the outgoing trunk 510 and to mark the incoming trunk 110 as busy to the toll second selectors and amplifiers 105, etc., and to the incoming toll selectors and amplifiers 153, etc. having access thereto. Specifically, the repeater 500 applies ground potential to the control conductor C513 of the trunk 510 in order to complete a circuit, including the set of switch springs S575, for energizing the upper winding of the transfer relay R560, thereby to cause the latter relay to operate. Also the application of ground potential to the control conductor C513 of the trunk 510 completes a loop circuit, including the contacts 531 and 533 and the line conductors C511 and C512 of the trunk 510, for energizing in series the upper and lower windings of the line relay R540; whereby the latter relay operates. Upon operating the line relay R540 completes, at the contacts 541, a circuit, including the contacts 537, for operating the hold relay R550. Upon operating the hold relay R550 completes, at the contacts 551, a direct path for applying ground potential to the control conductor C513 of the trunk 510 and a direct loop circuit, including the contacts 531 and 533 and the line conductors C511 and C512 of the trunk 510, for energizing in series the upper and lower windings of the line relay R540. Also the hold relay R550 completes, at the contacts 552, a circuit for energizing the intermediate winding of the switch relay R530 in order to render the latter relay fast to operate when the lower winding thereof is subsequently energized. Further the hold relay R550 prepares, at the contacts 554, a multiple circuit traced hereinafter for energizing the lower winding of the transfer relay R560 and for operating the vertical magnet M580 and the prepare relay R630. At this time the repeater 500 has responded to the seizure signal and has selected the incoming toll selector and amplifier 600 over the outgoing trunk 510; whereby the incoming toll selector and amplifier 600 is conditioned to respond to a digit transmitted thereto over the outgoing trunk 510 from the repeater 500.

The operator at the toll board 300 proceeds to dial the third digit mentioned; whereby the line relay in the repeater 405 follows causing the repeater 405 to cooperate with the associated tone unit 406 to transmit a corresponding series of splashes of unmodulated 1000 cycle current over the toll line 505, and constituting a dialing signal. The repeater 500 and the associated tone unit 501 respond to the dialing signal and repeat a corresponding series of impulses, constituting the third digit, over the loop circuit to the line relay R540; whereby the latter relay follows. Each time the line relay R540 restores and then reoperates, it interrupts and then recompletes, at the contacts 541, the circuit for energizing the winding of the hold relay R550; whereby the latter relay, being of the slow-to-release type, remains operated during impulsing. Also each time the line relay R540 restores and then reoperates, it completes and then interrupts, at the contacts 542, a circuit, including the contacts 537, 554 and 563, for energizing the lower winding of the transfer relay R560; whereby the latter relay, being of the slow-to-release type remains operated during impulsing. Further, each time the line relay R540 restores and then reoperates, it completes and then interrupts, at the contacts 542, a multiple circuit, including the contacts 537 and 554, for operating the vertical magnet M580; whereby the wiper carriage of the Strowger mechanism 680 is driven a corresponding number of steps in the vertical direction away from its normal vertical position. Also the first time the line relay R540 restores, it completes, at the contacts 542, a multiple circuit, including the contacts 537 and 554 and the second contacts of the set of switch springs S625 for operating the prepare relay R630. Upon operating the prepare relay R630 completes, at the contacts 632 and 631, a multiple circuit for operating the rotary magnet M623; whereby the prepare relay R630, being of the slow-to-release type is retained operated during impulsing and the wipers 621 and 622 of the gain setting switch 620 are driven a corresponding number of steps in the counterclockwise direction away from their normal rotary positions. Accordingly, the third digit dialed at the toll board 300 in the distant office 10 is registered by the vertical magnet M580 in the Strowger mechanism 680 and also by the rotary magnet M623 in the gain setting switch 620.

When the wiper carriage of the Strowger mechanism 680 is driven one step in the vertical direction away from its normal vertical position, the sets of switch springs S573, S574 and S575 are operated. More particularly, the set of switch springs S575 is operated to interrupt the circuit for energizing the upper winding of the transfer relay R560. Also when the wipers noted of the gain setting switch 620 are driven one step in the counterclockwise direction away from their normal rotary positions, the set of switch springs S625 is operated to close the first contacts thereof in order to complete a multiple holding circuit, also including the contacts 632, for energizing the winding of the prepare relay R630; and to interrupt, at the second contacts thereof, the original circuit for energizing the winding of the prepare relay R630.

At the conclusion of the third digit, the line relay in the repeater 405 is retained in its operated position indicating the termination of the third digit; whereby the dialing signal corresponding to the third digit is terminated; and the repeater 500 retains operated the line relay R540 in the incoming toll selector and amplifier 600. Shortly thereafter, the transfer relay R560 and the prepare relay R630 restore as they are of the slow-to-release type. Upon restoring the prepare relay R630 interrupts, at the contact 631, a further point in the circuit for operating the rotary magnet M623 of the gain setting switch 620. Upon restoring the transfer relay R560 completes, at the contacts 564, a circuit, including the contacts 537, 543 and 582 and the set of switch springs S573, for operating the rotary magnet M581. Upon operating the rotary magnet M581 interrupts, at the contacts 582, the operating circuit therefor and drives the wiper carriage of the Strowger mechanism 680 one step in the rotary direction away from its normal rotary position; whereby the first trunk in the group, including the trunk 160, is selected. At this time the switch relay R530 tests the idle or busy condition of the first trunk mentioned and assuming that it is busy, ground potential appearing upon the control conductor thereof completes a path, including the control wiper 685 of the Strowger mechanism 680, the contacts 562, 553, and 551, for short-circuiting the lower winding of the switch relay R530. Accordingly, the rotary magnet M581 restores in order to re-complete, at the contacts 582, the operating circuit therefor. Upon reoperating the rotary magnet M581 again interrupts, at the contacts 582, the operating circuit therefor and drives the wiper carriage of the Strowger mechanism 680 an additional step in the rotary direction. Accordingly, the rotary magnet M581 operates buzzer fashion as the trunks in the associated group are tested as busy by the switch relay R530.

Assuming that the trunk 160 is the first idle trunk in the selected group, when it is selected by the wiper set of the Strowger mechanism 680, battery potential appearing upon the control conductor C163 thereof completes a circuit substantially identical to that previously traced for energizing the lower winding of the switch relay R530; whereby the latter relay operates exceedingly fast, it being polarized by virtue of the completed circuit for energizing the intermediate winding thereof. Upon operating the switch relay R530 interrupts, at the contacts 537, the circuit for operating the rotary magnet M581; and completes, at the contacts 535, a holding circuit including the grounded hold conductor C513 of the trunk 510 for energizing the upper winding thereof. Also the switch relay R530 completes, at the contacts 536, a direct path, including the contacts 562, for applying ground potential to the control wiper 685 of the Strowger mechanism 680: and consequently to the control conductor C163 of the trunk 160 whereby the trunk 160 extending to the outgoing toll selector 170 is marked as busy to the other incoming toll selectors and amplifiers having access thereto. Also the switch relay R560 interrupts, at the contacts 537, a circuit for energizing the winding of the hold relay R550 in order to cause the latter relay to restore shortly thereafter, it, being of the slow-to-release type. Further the switch relay R530 interrupts, at the contacts 531 and 533, the loop circuit extending between the repeater 500 and the upper and lower windings of the line relay R540 in order to cause the latter relay to restore. Further the switch relay R530 completes, at the contacts 532 and 534, a connection including the contacts 643, 645 and 641', 649 between the line conductors C511 and C512 of the trunk 510 and the line wipers 683 and 684 of the Strowger mechanism 680 and consequently to the line conductors C161 and C162 of the trunk 160. This connection includes the winding of the series relay R660; whereby a loop circuit is completed between the repeater 500 and the line relay in the outgoing toll selector 170 via the trunks 510 and 160 and including the winding of the series relay R660; whereby the series relay R660 operates and the line relay in the outgoing toll selector 170 operates in order to effect seizure thereof. Upon restoring the hold relay R550 interrupts, at the contacts 551, the path for applying ground potential in the incoming toll selector and amplifier 600 to the control conductor C513 of the trunk 510; however, ground potential in the repeater 500 is retained upon the control conductor C513 of the trunk 510 in order to retain operated the switch relay R530. Also upon operating the switch relay R530 completes, at the contacts 538, the connection between the EC conductor C514 of the trunk 510 and the EC wiper 686 of the Strowger mechanism 680 and consequently the EC conductor C164 of the trunk 160 extending to the outgoing toll selector 170. Also upon restoring the hold relay R550 interrupts, at the contacts 552, the circuit for energizing the intermediate winding of the switch relay R530; and interrupts, at the contacts 553, the original operating circuit for energizing the lower winding of the switch relay R530; however without effect at this time. Upon operating the series relay R660 completes, at the contacts 661, a circuit for operating the control relay R655; and upon operating the control relay R655 completes, at the contacts 657, a circuit for operating the control relay R650.

At this time the incoming toll selector and amplifier 600 has responded to the third digit to select the correspinding group of trunks, including the trunk 160, and has operated automatically to select the particular idle trunk 160 extending to the outgoing toll selector 170; whereby the outgoing toll selector 170 is conditioned to be responsive to the fourth digit dialed at the toll board 300 in the distant office 10. As previously noted, the trunk 610 extending to the balancing network 615 is paired with the trunk 160 extending to the outgoing toll selector 170; whereby the wipers 681 and 682 of the Strowger mechanism 680 select the line conductors C611 and C612 of the trunk 610 when the wipers 683 and 684 of the Strowger mechanism 680 select the line conductors C161 and C162 of the trunk 160; the balancing network 615 being arranged to balance a local connection in the central office 20 extended either to one of the subscriber substations T20, etc., or to the toll board 100 therein.

As previously noted, the third digit dialed at the toll board 300 in the distant office 10 effected operation of the Strowger mechanism 680 to select the group of trunks including the trunk 160; and also the digit was registered in the gain setting switch 620. More particularly, the wiper 621 of the gain setting switch 620 engages a contact in the associated contact bank corresponding to the third digit, thereby to select a corresponding one of the resistors 626 and to connect the selected resistor 626 in multiple with the fifth or driving winding of the transformer 691; whereby the effective gain of the amplifier 694 is established appropriate to the attenuation of the toll line 505. Similarly, the wiper 622 of the gain setting switch 620 engages a contact in the associated contact bank corresponding to the third digit, thereby to select a corresponding one of the resistors 627 and to connect the selected resistor 627 in multiple with the fifth or driving winding of the transformer 692; whereby the effective gain of the amplifier 693 is established appropriate to a local connection either to one of the subscriber substations T20, etc., or to the toll board 100 in the central office 20.

The operator at the toll board 300 proceeds to dial the fourth digit mentioned; whereby the line relay in the repeater 405 follows causing the repeater 405 to cooperate with the associated tone unit 406 to transmit a corresponding series of splashes of unmodulated 1000 cycle current over the toll line 505, and constituting a dialing signal. The repeater 500 and the associated tone unit 501 respond to the dialing signal and repeat a corresponding series of impulses, constituting the fourth digit, over the loop circuit extending via the trunk 510, the incoming toll selector and amplifier 600 and the trunk 160 to the outgoing toll selector 170; whereby the outgoing toll selector 170 is operated to select the group of trunks, including the trunk 171, and then an idle trunk in the selected group. Assuming that the outgoing toll selector 170 selects the particular trunk 171 extending to the toll connector 172, the outgoing toll selector 170 switches through to extend the loop circuit via the trunk 171 to the toll connector 172; whereby the toll connector 172 is conditioned to be responsive to the fifth and sixth digits dialed at the toll board 300 in the distant office 10.

The operator at the toll board 300 proceeds to dial the fifth and sixth digits mentioned; whereby the repeater 405 responds cooperating with the associated tone unit 406 to transmit two corresponding dialing signals over the toll line 505 as previously explained; whereby the repeater 500 and the associated tone unit 501 respond in order to transmit two corresponding series of impulses over the loop circuit extending to the toll connector 172; whereby the toll connector 172 is operated to select the subscriber line 173 extending to the called subscriber substation T20 in the central office 20. The subsequent operation of the toll connector 172 depends upon the idle or busy condition of the called subscriber substation T20 at this time, the subscriber line 173 being marked as idle or busy by the associated line circuit, not shown.

First assuming that the called subscriber substation T20 is idle at this time, the toll connector 172 operates to seize the subscriber line 173 and to dry or interrupt the supply of battery current to the loop circuit extending back via the trunk 171, the outgoing toll selector 170, the trunk 160, the incoming toll selector and amplifier 600 and the trunk 510 to the repeater 500. When this loop circuit is thus dried, the winding of the series relay R660 in the incoming toll selector and amplifier 600 is deenergized; whereby the latter relay restores to interrupt, at the contacts 661, the circuit for energizing the winding of the control relay R655; whereby the latter relay restores shortly thereafter, it being of the slow-to-release type. Upon restoring the control relay R655 interrupts, at the contacts 657, the circuit for energizing the winding of the control relay R650; whereby the latter relay restores shortly thereafter, it being of the slow-to-release type. Also upon restoring the control relay R655 completes, at the contacts 656, a circuit, including the contacts 651, for operating the switch-through relay R640. Upon operating the switch-through relay R640 completes, at the contacts 641, a holding circuit, including the contacts 532 and 536, for energizing the winding thereof. Also the switch-through relay R640 interrupts, at the contacts 643, 645, 649 and 641′, the direct connection between the line conductors C511 and C512 of the trunk 510 and the line wipers 683 and 648 of the Strowger mechanism 680; completes, at the contacts 642 and 644, a connection, including the contacts 532 and 534, between the line conductors C511 and C512 of the trunk 510 and the first and second windings of the repeating coil 690; completes, at the contacts 646 and 647, a connection between the conductors C676 and C677 of the trunk 675 extending to the balancing network 678 and the fourth and second windings of the transformer 691; completes, at the contacts 648 and 640, connections between the line wipers 684 and 683 of the Strowger mechanism 680 and the first and third windings of the transformer 692; and completes, at the contacts 642′ and 643′, connections between the wipers 682 and 681 of the Strowger mechanism 680 and the fourth and second windings of the transformer 692. Accordingly, at this time the trunk 510 is operatively connected to the first and second windings of the repeating coil 690; the third and fourth windings of the repeating coil 690 are connected via the first, third and second, fourth windings of the transformer 691 to the balancing network 678; the balancing network 678 being arranged to balance the toll line 505 as previously noted. Moreover, the balancing network 615 is connected via the second, fourth and first, third windings of the transformer 692 to the trunk 160 and consequently via the outgoing toll selector 170, the trunk 171, the toll connector 172 and the subscriber line 173 to the called subscriber substation T20; the balancing network 615 being arranged to balance the local connection to the called subscriber substation T20 as previously explained. Also when the toll connector 172 switches through it applies ground potential to the EC conductor of the trunk 171 and consequently via the connection to the EC conductor C164 of the trunk 160 and consequently via the EC wiper 686 of the Strowger mechanism 680 and the contacts 538 to the EC conductor C514 of the trunk 510 extending from the repeater 500. Accordingly, when the loop circuit extending back over the line conductors C511 and C512 of the trunk 510 is dried and ground potential is applied to the EC conductor C514 of the trunk 510, the repeater 500 is controlled to transmit a splash of battery potential over the positive line conductor C512 of the trunk 510, thereby to complete a circuit, including the contacts 534 and 644 and the second winding of the repeating coil 690, for operating the ring relay R665. Thus, the ring relay R665 operates and then restores completing and then interrupting, at the contacts 667, a path, including the contacts 648, for applying a splash of battery potential via the resistors 668 and the line wiper 684 of the Strowger mechanism 680 to the positive line conductor C162 of the trunk 160 and consequently over the connection to the positive line conductor of the trunk 171 extending to the toll connector 172; whereby the toll connector 172 is operated to institute a ringing cycle. More particularly, the toll connector 172 operates to project ringing current over the subscriber line 173 to the called subscriber substation T20 in order to operate the ringer thereat indicating the presence of a call waiting to be answered.

Also the repeater 500 is controlled in conjunction with the tone unit 501 at this time to send a splash of 60 cycle modulated 1000 cycle current over the toll line 505 and constituting an end-of-dialing signal. The repeater 405 and the associated tone unit 406 respond to the end-of-dialing signal to dry or interrupt the supply of battery current to the loop circuit extending from the line relay therein back to the toll board 300; whereby the winding of the series relay R460 in the toll second selector and amplifier 400 is interrupted causing the latter relay to restore. Also the repeater 405 operates to return ground potential over the EC conductor C424 of the trunk 420 and consequently over the EC conductor C324 of the trunk 320 thereby to illuminate the front supervisory lamp associated with the cord circuit in use at the toll board 300 in order to indicate to the operator thereat that the connection has been extended to the called subscriber substation T20 in the central office 20 and that the called subscriber substation T20 is being rung at this time. Further, the repeater 405 operates in conjunction with the tone unit 406 to complete a monitoring connection between the line conductors of the toll line 505 and the line conductors C421 and C422 of the trunk 420; whereby the end-of-dialing signal on the line conductors of the toll line 505 is amplified and impressed upon the line conductors C421 and C422 of the trunk 420 so that it may be heard as an audible signal at the toll board 300. Upon restoring the series relay R460 interrupts, at the contacts 461, the circuit for energizing the winding of the control relay R455 in order to cause the latter relay to restore shortly thereafter, it being of the slow-to-release type. Upon restoring the control relay R455 interrupts, at the contacts 457, the circuit for energizing the winding of the control relay R450; whereby the latter relay restores shortly thereafter, it being of the slow-to-release type. Also upon restoring the control relay R455 completes, at the contacts 456, a circuit, including the contacts 451, for operating the switch-through relay R440. Upon operating the switch-through relay R440 completes, at the contacts 441, a holding circuit, including the contacts 362 and 336, for energizing the winding thereof. Also the switch-through relay R440 interrupts, at the contacts 443, 445, 449 and 441′, the direct connection between the line conductors C321 and C322 of the trunk 320 and the line wipers 483 and 484 of the Strowger mechanism 480; completes, at the contacts 442 and 444, a connection, including the contacts 332 and 334, between the line conductors C321 and C322 of the trunk 320 and the first and second windings of the repeating coil 490; completes, at the contacts 446 and 447, a connection between the conductors C476 and C477 of the trunk 475 extending to the balancing network 478 and the fourth and second windings of the transformer 491; completes, at the contacts 448 and 440, connections between the line wipers 484 and 483 of the Strowger mechanism 480 and the first and third windings of the transformer 492; and completes, at the contacts 442′ and 443′, connections between the wipers 482 and 481 of the Strowger mechanism 480 and the fourth and second windings of the transformer 492. Accordingly, at this time the trunk 320 is operatively connected to the first and second windings of the repeating coil 490; the third and fourth windings of the repeating coil 490 are connected via the first, third and second, fourth windings of the transformer 491 to the balancing network 478; the balancing network 478 being arranged to balance the local connection back to the toll board 300, as previously noted. Moreover, the balancing network 435 is connected via the second, fourth and first, third windings of the transformer 492 to the trunk 420 and consequently to the repeater 405; the balancing network 435 being arranged to balance the toll line 505, as previously explained.

When the subscriber at the called subscriber substation T20 in the central office 20 answers the call, the toll connector 172 operates to arrest the projection of ringing current over the subscriber line 173 thereto and interrupts the application of ground potential upon the EC conductor of the trunk 171 and consequently upon the EC conductor C164 of the trunk 160 and the EC conductor C514 of the trunk 510. When ground potential is thus removed from the EC conductor C514 of the trunk 510, the repeater 500 operates in conjunction with the tone unit 501 to send a short splash of 60 cycle modulated 1000 cycle current over the toll line 505, and constituting an answer signal. The repeater 405 and the associated tone unit 406 respond to the answer signal; whereby the repeater 405 switches through interrupting the monitoring connection between the line conductors of the toll line 505 and the line conductors C421 and C422 of the trunk 420 and removing ground potential from the EC conductor C424 of the trunk 420. When ground potential is thus removed from the EC conductor C424 of the trunk 420 and consequently from the EC conductor C324 of the trunk 320, the front supervisory lamp associated with the cord circuit in use at the toll board 300 is extinguished in order to indicate to the operator thereat that the call has been answered at the called subscriber substation T20 in the central office 20.

At this time an established connection is completed between the calling toll board 300 in the distant office 10 and the called subscriber substation T20 in the central office 20. Specifically, the operator's headset at the toll board 300 is connected via the trunk 301, the toll line circuit 302, the toll first selector 303 and the line conductors of the trunk 320 to the first and second windings of the repeating coil 490 in the toll second selector and amplifier 400. The third and fourth windings of the repeating coil 490 are connected via the first, third and second, fourth windings of the transformer 491 to the balancing network 478; the balancing network 435 is connected via the second, fourth and first, third windings of the transformer 492 to the line conductors of the trunk 420 and thence to the repeater 405. The repeater 405 is operatively connected via the toll line 505 incorporating the voice current repeaters 505A and 505B to the repeater 500. The repeater 500 is connected to the line conductors of the trunk 510 that, in turn, are connected to the first and second windings of the repeating coil 690. The third and fourth windings of the repeating coil 690 are connected via the first, third and second, fourth windings of the transformer 691 to the balancing network 678; and the balancing network 615 is connected via the second, fourth and first, third windings of the transformer 692 to the line conductors of the trunk 160 and thence via the outgoing toll selector 170, the trunk 171, the toll connector 172 and the subscriber line 173 to the called subscriber substation T20 in the central office 20. Also in the toll second selector and amplifier 400, the junctions between the first, second and third, fourth windings of the transformer 491 are connected to the input circuit of the amplifier 493; and the output circuit of the amplifier 493 is connected to the fifth or driving winding of the transformer 492; similarly, the junctions between first, second and third, fourth windings of the transformer 492 are connected to the input circuit of the amplifier 494; and the output circuit of the amplifier 494 is connected to the fifth or driving winding of the transformer 491. Likewise, in the incoming toll selector and amplifier 600, the junctions between the first, second and third, fourth windings of the transformer 691 are connected to the input circuit of the amplifier 693; and the output circuit of the amplifier 693 is connected to the fifth or driving winding of the transformer 692; similarly, the junctions between the first, second and third, fourth windings of the transformer 692 are connected to the input circuit of the amplifier 694; and the output circuit of the amplifier 694 is connected to the fifth or driving winding of the transformer 691.

Accordingly, when the operator at the toll board 300 speaks, the audio currents traversing the trunk 301, the line circuit 302, the toll first selector 303 and the trunk 320 traverse the first and second windings of the repeating coil 490 inducing corresponding audio currents in the third and fourth windings thereof; which induced audio currents traverse the first, third and second, fourth windings of the transformer 491 and the balancing network 478. The voltage drop across the second and fourth windings of the transformer 491 and the balancing network 478 is applied to the input circuit of the amplifier 493; whereby the amplified audio currents in the output circuit of the amplifier 493 traverse the fifth or driving winding of the transformer 492. The audio currents traversing the fifth winding of the transformer 492 induce algebraically additive audio voltages in the first and third windings thereof that are applied to the line conductors of the trunk 420 extending to the repeater 405; and also induce conjugate audio voltages in the second and fourth windings thereof which are productive of no audio potential applied to the input circuit of the amplifier 494, thereby preventing singing of the amplifiers 493 and 494. The audio currents traversing the repeater 405 cause corresponding audio currents to traverse the toll line 505 incorporating the voice current repeaters 505A and 505B and consequently the repeater 500. The audio currents traversing the repeater 500 cause corresponding audio currents to traverse the trunk 510 and the first and second windings of the repeating coil 690. The audio currents traversing the first and second windings of the repeating coil 690 induce corresponding audio currents in the third and fourth windings thereof; which induced audio currents traverse the first, third and second, fourth windings of the transformer 691 and the balancing network 678. The voltage drop across the second and fourth windings of the transformer 691 and the balancing network 678 is applied to the input circuit of the amplifier 693; whereby the amplified audio currents in the output circuit of the amplifier 693 traverse the fifth or driving winding of the transformer 692, as well as the multiple connected selected resistor 627. The audio currents traversing the fifth winding of the transformer 692 induce algebraically additive audio voltages in the first and third windings thereof that are applied to the line conductors of the trunk 160 extending to the outgoing toll selector 170; and also induce conjugate audio voltages in the second and fourth windings thereof which are productive of no audio potential applied to the input circuit of the amplifier 694, thereby preventing singing of the amplifiers 693 and 694. The audio currents traverse the toll outgoing selector 170, the trunk 171, the toll connector 172, the subscriber line 173 and the substation equipment at the called subscriber substation T20.

Similarly, when the subscriber at the called subscriber substation T20 speaks, the audio currents traversing the subscriber line 173, the toll connector 172, the trunk 171, the outgoing toll selector 170 and the trunk 160 traverse the first, third and second, fourth windings of the transformer 692 and the balancing network 615. The voltage drop across the second and fourth windings of the transformer 692 and the balancing network 615 is applied to the input circuit of the amplifier 694; whereby the amplified audio currents in the output of the amplifier 694 traverse the fifth or driving winding of the transformer 691, as well as the multiple connected selected resistor 626. The audio currents traversing the fifth winding of the transformer 691 induce algebraically additive audio voltages in the first and third windings thereof that traverse the third and fourth windings of the repeating coil 690; and also induce conjugate audio voltages in the second and fourth windings thereof which are productive of no audio potential applied to the input circuit of the amplifier 693, thereby preventing singing of the amplifiers 693 and 694. The audio currents traversing the third and fourth windings of the repeating coil 690 induce corresponding audio currents in the first and second windings thereof which traverse the trunk 510 and the repeater 500. The audio currents traversing the repeater 500 cause corresponding audio currents to traverse the toll line 505 incorporating the voice current repeaters 505B and 505A and consequently the repeater 405. The audio currents traversing the repeater 500 cause corresponding audio currents to traverse the trunk 420 and the first, third and second, fourth windings of the transformer 492 and the balancing network 435. The voltage drop across the second and fourth windings of the transformer 492 and the balancing network 435 is applied to the input circuit of the amplifier 494; whereby the amplified audio currents in the output of the amplifier 494 traverse the fifth or driving winding of the transformer 491. The audio currents traversing the fifth winding of the transformer 491 induce algebraically additive audio voltages in the first and third windings thereof that traverse the third and fourth windings of the repeating coil 490; and also induce conjugate audio voltages in the second and fourth windings thereof which are productive of no audio potential applied to the input circuit of the amplifier 493, thereby preventing singing of the amplifiers 493 and 494. The audio currents traversing the third and fourth windings of the repeating coil 490 induce corresponding audio currents in the first and second windings thereof which traverse the trunk 320, the toll first selector 303, the toll line circuit 302 and the trunk 301 and the headset at the toll board 300.

In this toll connection, the selected resistor 627 connected in multiple to the fifth or driving winding of the transformer 692 insures the required effective gain of the amplifier 693 in the connection extending to the called subscriber substation T20; while the selected resistor 626 connected in multiple to the fifth or driving winding of the transformer 691 insures the required effective gain of the amplifier 694 in the connection extending via the toll line 505 to the calling toll board 300. Similarly, in this toll connection the coupling between the fifth or driving winding of the transformer 491 and the first and third windings thereof, is selected to insure the required effective gain of the amplifier 494 in the connection extending to the calling toll board 300; while the coupling between the fifth or driving winding of the transformer 492 and the first and third windings thereof is selected to insure the required effective gain of the amplifier 493 in the connection extending via the toll line 505 to the called subscriber substation T20.

At the conclusion of the established connection, when the subscriber at the called subscriber substation T20 disconnects, the toll connector 172 responds to apply 60 ground impulses per minute to the EC conductor of the trunk 171 and consequently to the EC conductor C164 of the trunk 160 and the EC conductor C514 of the trunk 510; whereby the repeater 500 and the associated tone unit 501 respond to send 60 splashes per minute of 60 cycle modulated 1000 cycle current over the toll line 505, and constituting a disconnect signal. The repeater 405 and the associated tone unit 406 respond to the disconnect signal to apply 60 ground impulses per minute to the EC conductor C424 of the trunk 420 and consequently to the EC conductor C324 of the trunk 320; whereby the front supervisory lamp associated with the cord circuit in use at the toll board 300 is flashed 60 times per minute, and constituting a disconnect signal to the operator thereat.

Upon receiving the disconnect signal, the operator at the toll board 300 may disconnect to effect the release of the connection or re-ring the subscriber at the called subscriber substation T20. First assuming that the operator re-rings the subscriber at the called subscriber substation T20, this is accomplished by momentary operation of the ring key at the toll board 300; whereby a splash of battery potential is connected to the positive line conductors of the trunk 301 and consequently to the positive line conductor C322 of the trunk 320 completing a circuit, including the contacts 334 and 444 and the second winding of the repeating coil 490, for operating the ring relay R465. Accordingly, the ring relay R465 operates and then restores, completing and then interrupting, at the contacts 467, a path, including the contacts 448 and the line wiper 484 of the Strowger mechanism 480, for applying battery potential via the resistor 468 to the positive line conductor C422 of the trunk 420 extending to the repeater 405. The repeater 405 and the associated tone unit 406 respond and send a short splash of 60 cycle modulated 1000 cycle current over the toll line 505, and constituting a re-ring signal. The repeater 500 and the associated tone unit 501 respond to the re-ring signal to apply a splash of battery potential to the positive line conductor C512 of the trunk 510 completing a circuit, including the contacts 534 and 644 and the second winding of the repeating coil 690, for operating the ring relay R665. Accordingly, the ring relay R665 operates and then restores completing and then interrupting, at the contacts 667, a path, including the contacts 648 and the line wiper 684 of the Strowger mechanism 680, for applying a splash of battery potential via the resistor 668 to the positive line conductor C162 of the trunk 160 and through the connection to the positive line conductor of the trunk 171 extending to the toll connector 172. The toll connector 172 responds to the splash of battery potential upon the positive line conductor of the trunk 171 to initiate another ringing cycle thereof. More particularly, the toll connector 172 operates to project ringing current over the subscriber line 173 in order to operate the ringer at the called subscriber substation T20 in order again to signal the subscriber thereat.

When the subscriber at the called subscriber substation T20 reanswers the call, the toll connector 172 operates to interrupt the application of 60 ground impulses per minutes from the EC conductor of the trunk 171 and consequently from the EC conductor C164 of the trunk 160 and the EC conductor C514 of the trunk 510 extending to the repeater 500. The repeater 500 and the associated tone unit 501 respond to arrest transmission of the disconnect signal over the toll line 505. The repeater 405 and the associated tone unit 406 respond to the termination of the disconnect signal over the toll line 505 to interrupt the application of 60 ground impulses per minute from the EC conductor C424 of the trunk 420 and consequently from the EC conductor C324 of the trunk 320 in order again to extinguish the front supervisory lamp associated with the cord circuit in use at the toll board 300 in order again to indicate to the operator thereat that the call has again been answered at the called subscriber substation T20.

When the operator at the toll board 300 receives the disconnect signal she may disconnect effecting the release of the connection. More particularly, the operator at the toll board 300 withdraws the front plug of the cord circuit in use from the jack terminating the trunk 301 in order to effect the release of the toll line circuit 302 and the toll first selector 303. When the toll first selector 303 is thus released, ground potential therein is removed from the control conductor C323 of the trunk 320 interrupting the holding circuit for energizing the upper winding of the switch relay R330 in order to cause the latter relay to restore. Upon restoring the switch relay R330 interrupts, at the contacts 336, the holding circuit for retaining operated the switch-through relay R440 and the multiple path for applying ground potential via the control wiper 485 of the Strowger mechanism 480 to the control conductor C423 of the trunk 420 extending to the repeater 405. Also upon restoring the switch relay R330 completes, at the contacts 337, a circuit, including the contacts 342 and 355 and the set of switch springs S374, for operating the release magnet M383; whereby the wiper carriage of the Strowger mechanism 480 is released and returned to its normal rotary and vertical positions. When the wiper carriage of the Strowger mechanism is thus released, the sets of switch springs S373, S374 and S375 are operated. More particularly, the set of switch springs S374 is operated to interrupt the operating circuit for the release magnet M383; and the set of switch springs S375 is operated in order again to apply battery potential by way of the upper winding of the transfer relay R360 to the control conductor C323 of the trunk 320, again marking the trunk 320 and the toll second selector and amplifier 400 as idle to the toll first selectors 303, etc., having access thereto.

The repeater 405 and the associated tone unit 406 respond to the removal of ground potential from the control conductor C423 of the trunk 420 to send a long splash of 60 cycle modulated 1000 cycle current over the toll line 505, and constituting a release signal; and then the repeater 405 and the associated tone unit 406 are released; whereby battery potential in the repeater 405 is again applied to the control conductor C423 of the trunk 420 again marking the trunk 420 and the repeater 405 as idle to the toll second selectors and amplifiers 400, etc., having access thereto. The repeater 500 and the associated tone unit 501 respond to the release signal transmitted over the toll line 505 to interrupt the application of ground potential to the control conductor C513 of the trunk 510, thereby to interrupt the holding circuit for energizing the upper winding of the switch relay R530 in order to cause the latter relay to restore. The repeater 500 and the associated tone unit 501 are then released, the repeater 500 operating to apply battery potential to the control conductor of the incoming trunk 110 in order again to mark the incoming trunk 110 and the repeater 500 as idle to the toll second selectors and amplifiers 105, etc., and to the incoming toll selectors and amplifiers 153, etc., having access thereto.

Upon restoring the switch relay R530 interrupts, at the contacts 536, the holding circuit for retaining operated the switch-through relay R640 and the multiple path for applying ground potential by way of the control wiper 685 of the Strowger mechanism 680 to the control conductor C163 of the trunk 160. Also upon restoring the switch relay R530 completes, at the contacts 537, a circuit including the contacts 542 and 555 and the set of switch springs S574, for operating in multiple the release magnets M583 and M624. Upon operating the release magnet M583 releases the wiper carriage of the Strowger mechanism 680 causing it to be returned to its normal rotary and vertical positions; whereupon the sets of switch springs S573, S574 and S575 are operated. Upon operating the release magnet M624 releases the wipers 621 and 622 of the gain setting switch 620 causing them to be returned to their normal rotary positions; whereupon the set of switch springs S625 is operated. More particularly, the set of switch springs S574 is operated to interrupt the multiple operating circuits for the release magnets M583 and M624; and the set of switch springs S575 is operated in order again to apply battery potential by way of the upper winding of the transfer relay R560 to the control conductor C513 of the trunk 510. When ground potential is removed from the control conductor C163 of the trunk 160, the outgoing toll selector 170 and consequently the toll connector 172 are released. Battery potential in the outgoing toll selector 170 is returned upon the control conductor C163 of the trunk 160 in order to mark the trunk 160 and the outgoing toll selector 170 as idle to the incoming toll selectors and amplifiers 600, etc., having access thereto. Similarly, battery potential in the toll connector 172 is returned upon the control conductor of the trunk 171 in order to mark the trunk 171 and the toll connector 172 as idle to the outgoing toll selectors 170, etc., having access thereto. Also battery potential in the line circuit, not shown, associated with the subscriber line 173 is returned upon the control conductor thereof in order again to mark the subscriber line 173 extending to the subscriber substation T20 as idle to the toll connectors 172, etc., and to the connectors in the local switch train, not shown, having access thereto. At this time the established connection between the calling toll board 300 in the distant office 10 and the called subscriber substation T20 in the central office 20 is released and all of the apparatus involved therein is completely released and available for further use.

Reconsidering the extension of the connection from the calling toll board 300 in the distant office 10 to the called subscriber substation T20 in the central office 20, it may occur that the called subscriber substation T20 is busy when the toll connector 172 operates in response to the sixth digit to select the subscriber line 173 extending thereto. In this case, the toll connector 172 operates in order to dry or interrupt the supply of battery current to the loop circuit extending back over the connection to the repeater 500 and to apply 60 ground impulses per minute to the EC conductor of the trunk 171 and consequently to the EC conductor C164 of the trunk 160 and the EC conductor C514 of the trunk 510. When the loop circuit mentioned is thus dried, the series relay R660 restores effecting restoration of the control relays R655 and R650 and the consequent operation of the switch-through relay R640; all in the manner previously explained. Also the repeater 500 and the associated tone unit 501 respond to send 60 splashes per minute of 60 cycle modulated 1000 cycle current over the toll line 505, and constituting a line busy signal. In passing, it is noted that the line busy signal is identical to the disconnect signal previously mentioned. The repeater 405 and the associated tone unit 406 respond to the line busy signal to dry or interrupt the supply of battery current to the loop circuit extending back to the toll board 300; whereby the series relay R460 restores effecting the restoration of the control relays R455 and R450 and the consequent operation of the switch-through relay R440 in the manner previously explained. Also the repeater 405 operates to apply 60 ground impulses per minute to the EC conductor C424 of the trunk 420 and consequently to the EC conductor C324 of the trunk 320 in order to effect flashing 60 times per minute of the front supervisory lamp associated with the cord circuit in use at the toll board 300. The flashing 60 times per minute of the front supervisory lamp mentioned indicates to the operator at the toll board 300 that the connection has been extended to the called subscriber substation T20 and that the subscriber line extending thereto has been tested by the toll connector in use as being busy. Also the repeater 405 responds to complete the previously mentioned monitoring connection between the line conductors of the toll line 505 and the line conductors C421 and C422 of the trunk 420 via the amplifying arrangement in the associated tone unit 406; whereby the operator at the toll board 300 receives a corresponding audio line busy signal. The operator at the toll board 300 then releases the connection thus far extended by withdrawing the front plug of the cord circuit in use thereat from the jack terminating the trunk 301 in order to effect the release of the operated apparatus in the manner previously explained.

Also during the extension of the connection from the calling toll board 300 after the outgoing toll selector 170 responds to the fourth digit, it may test as busy all of the trunks in the group, including the trunk 171; whereby the outgoing toll selector 170 operates to dry or interrupt the supply of battery current to the loop circuit extending back over the connection to the repeater 500 and to apply 120 ground impulses per minute to the EC conductor C164 of the trunk 160 and consequently to the EC conductor C514 of the trunk 510 extending to the repeater 500. When the loop circuit mentioned is thus dried, the incoming toll selector and amplifier 600 is switched through; and the repeater 500 and the associated tone unit 501 operate to send 120 splashes per minute of 60 cycle modulated 1000 cycle current over the toll line 505, and constituting a trunk busy signal. The repeater 405 and the associated tone unit 406 respond to the trunk busy signal to dry or interrupt the supply of battery current to the loop circuit extending back to the calling toll board 300 and to apply 120 ground impulses per minute to the EC conductor C424 of the trunk 420; whereby the toll second selector and amplifier 400 is switched through and the front supervisory lamp associated with the cord circuit in use at the toll board 300 is flashed 120 times per minute indicating to the operator thereat that an all-trunks-busy condition has been encountered in the toll switch train. Also the repeater 405 responds to complete the previously mentioned monitoring connection between the line conductors of the toll line 505 and the line conductors C421 and C422 of the trunk 420 via the amplifying arrangement in the associated tone unit 406; whereby the operator at the toll board 300 receives a corresponding audio trunk busy signal. The operator at the toll board 300 then withdraws the front plug of the cord circuit in use from the jack terminating the trunk 301 in order to bring about the release of the apparatus operated at this time.

Also during the extension of the connection from the calling toll board 300 after the incoming toll selector and amplifier 600 responds to the third digit, it may test as busy all of the trunks in the group, including the trunk 160; whereby the wiper carriage of the Strowger mechanism 680 is driven eleven steps in the rotary direction away from its normal rotary position in order to operate the sets of switch springs S576 and S577. More particularly, the set of switch springs S576 is operated to complete a circuit for energizing in series the upper winding of the transfer relay R560 and the lower winding of the switch relay R530 via the grounded control conductor C513 of the trunk 510; whereby the relays mentioned operate. Upon operating the switch relay R530 effects the restoration of the line relay R540 and the consequent restoration of the hold relay R550 shortly thereafter, the latter relay being of the slow-to-release type. Also upon operating, the switch relay R530 interrupts, at the contacts 537, the operating circuit for the rotary magnet M581 in order to arrest further operation of the Strowger mechanism 680 in the rotary direction. Also the set of switch springs S577 is operated to connect the 120 ground impulses per minute conductor C578 to the EC conductor C514 of the trunk 510. Accordingly, at this time the loop circuit from the repeater 500 is dried in that the supply of battery current thereto is interrupted; whereby the repeater 500 and the associated tone unit 501 operate to send 120 splashes per minute of 60 cycle modulated 1000 cycle current over the toll line 505, and constituting the trunk-busy signal. The repeater 405 and the associated tone unit 406 respond to the trunk-busy signal in order to bring about flashing of the front supervisory lamp associated with the cord circuit in use at the toll board 300 in the manner previously explained, thereby rendering to the operator at the toll board 300 all-trunk-busy supervision. Also the repeater 405 responds to complete the previously mentioned monitoring connection between the line conductors of the toll line 505 and the line conductors C421 and C422 of the trunk 420 via the amplifying arrangement in the associated tone unit 406; whereby the operator at the toll board 300 receives a corresponding audio trunk busy signal. The operator at the toll board 300 then withdraws the front plug of the cord circuit in use from the jack terminating the trunk 301 in order to bring about the release of the apparatus operated at this time.

Similarly, during the extension of the connection from the calling toll board 300 after the toll second selector and amplifier 400 responds to the second digit, it may test as busy all of the trunks in the group, including the trunk 420, whereby the wiper carriage of the Strowger mechanism 480 is driven eleven steps in the rotary direction away from its normal rotary position in order to operate the sets of switch springs S376 and S377. More particularly, the set of switch springs S376 is operated to complete a circuit for energizing in series the upper winding of the transfer relay R360 and the lower winding of the switch relay R330 via the grounded control conductor R323 of the trunk 320; whereby the relays mentioned operate. Upon operating the switch relay R330 effects the restoration of the line relay R340 and the consequent restoration of the hold relay R350 shortly thereafter, the latter relay being of the slow-to-release type. Also upon operating, the switch relay R330 interrupts, at the contacts 337, the operating circuit for the rotary magnet M381 in order to arrest further operation of the Strowger mechanism 480 in the rotary direction. Also the set of switch springs S377 is operated to connect the 120 ground impulses per minute conductor C378 to the EC conductor C324 of the trunk 320. Accordingly, at this time the front supervisory lamp associated with the cord circuit in use at the toll board 300 is flashed 120 times per minute in order to indicate to the operator thereat that an all-trunks-busy condition has been encountered in the toll switch train. The operator at the toll board 300 then withdraws the front plug of the cord circuit in use from the jack terminating the trunk 301 in order to bring about the release of the apparatus operated at this time.

Finally, during the extension of the connection from the calling toll board 300, after the toll first selector 303 responds to the first digit, it may test as busy all of the trunks in the group, including the trunk 320; whereby the toll first selector 303 operates to apply 120 ground impulses per minute through the toll line circuit 302 to the EC conductor of the trunk 301 in order to bring about flashing 120 times per minute of the front supervisory lamp associated with the cord circuit in use at the toll board 300 rendering to the operator thereat all-trunks-busy supervision. The operator at the toll board 300 then withdraws the front plug of the cord circuit in use from the jack terminating the trunk 301 in order to bring about the release of the apparatus operated at this time.

*Sect. 4.—Extension of a call from the toll board in the distant office to the toll board in the central office*

The extension of a call from the toll board 300 in the distant office 10 to the toll board 100 in the central office 20 is fundamentally the same as the extension of a call to the called subscriber substation T20 in the central office 20 described in Sect. 3. In this case, the operator at the toll board 300 may select the toll first selector 303 via the toll line circuit 302 and the trunk 301; the toll first selector 303 may respond to the first digit to select the trunk 320 extending to the toll second selector and amplifier 400; the toll second selector and amplifier 400 may respond to the second digit to select the incoming trunk 420 extending to the repeater 405; the repeater 405 may seize over the toll line 505 the repeater 500; the repeater 500 may seize over the outgoing trunk 510 the incoming toll selector and amplifier 600; the incoming toll selector and amplifier 600 may respond to the third digit to select the trunk 160 extending to the outgoing toll selector 170; and the outgoing toll selector 170 may respond to the fourth digit to select first the group of trunks, including the trunk 174 and then an idle trunk therein. For example, the outgoing toll selector 170 may select the particular trunk 174 extending to the toll trunk circuit 175; whereby it operates to dry the loop circuit extending back to the repeater 500 and to cause the incoming toll selector and amplifier 600 to switch through. The repeater 500 then operates to apply a splash of battery potential to the positive line conductor C512 of the trunk 510 in order to effect operation of the ring relay R665; whereby the latter relay causes a splash of battery potential to be applied to the positive line conductor C162 of the trunk 160 and consequently to the positive line conductor of the trunk 174 extending to the toll trunk circuit 175. Also the repeater 500 and the associated tone unit 501 send the end-of-dialing signal over the toll line 505; whereby the repeater 405 and the associated tone unit 406 respond drying or interrupting the supply of battery current to the loop circuit extending back to the toll board 300 and causing the toll second selector and amplifier 400 to switch through and illuminating the front supervisory lamp associated with the cord circuit in use at the toll board 300. When the splash of battery potential is applied to the positive line conductor of the trunk 174, the toll trunk circuit 175 responds in order to illuminate over the trunk 176, the answer lamp associated with the jack at the toll board 100 terminating the trunk 176, thereby to indicate to the operator at the toll board 100 that a call is waiting to be answered. The operator at the toll board 100 answers the call by selecting an idle cord circuit and then inserting the rear plug thereof into the jack terminating the trunk 176 extinguishing the associated answer lamp; whereby the toll trunk circuit 175 responds interrupting the application of ground potential applied to the EC conductor of the trunk 174 and consequently to the EC conductor C164 of the trunk 160 and the EC conductor C514 of the trunk 510. The repeater 500 and the associated tone unit 501 respond by sending an answer signal over the toll line 505; whereby the repeater 405 and the associated tone unit 406 respond by removing ground potential from the EC conductor C424 of the trunk 420 and consequently from the EC conductor C324 of the trunk 320 in order to extinguish the front supervisory lamp associated with the cord circuit in use at the toll board 300. At this time an established connection is completed between the calling toll board 300 in the distant office 10 and the called toll board 100 in the central office 20 and conversation therebetween may take place in the manner previously explained.

When the operator at the called toll board 100 disconnects by withdrawing the rear plug of the cord circuit in use thereat from the jack terminating the trunk 176, the toll trunk circuit 175 is controlled to apply 60 ground impulses per minute to the EC conductors of the trunk 174 and consequently to the EC conductor C164 of the trunk 160; whereby the repeater 500 and the associated tone unit 501 is governed to send the disconnect signal over the toll line 505; whereby the repeater 405 and the associated tone unit 406 respond transmitting 60 ground impulses per minute over the EC conductor C424 of the trunk 420 in order to bring about corresponding flashing of the front supervisory lamp associated with the cord circuit in use at the toll board 300 rendering to the operator thereat disconnect supervision.

At this time the operator at the toll board 300 may disconnect effecting the release of the connection or re-signal the operator at the toll board 100. In order to re-signal the operator at the toll board 100, the ring key at the toll board 300 is momentarily operated effecting operation of the ring relay R465 in the toll second selector and amplifier 400; whereby the repeater 405 and the associated tone unit 406 operate to send the re-ring signal over the toll line 505; whereby the repeater 500 and the tone unit 501 respond effecting operation of the ring relay R665. Upon operating the ring relay R665 transmits a splash of battery potential over the positive line conductor C162 of the trunk 160 and consequently over the positive line conductor of the trunk 174 in order to cause the toll trunk circuit 175 again to illuminate over the trunk 176 the answer lamp associated with the jack terminating the trunk 176. The illumination of the answer lamp mentioned indicates to the operator at the toll board 100 the recall on the trunk 176. The operator at the toll board 100 answers the recall by selecting an idle one of the cord circuits thereat and by inserting the rear plug thereof into the jack terminating the trunk 176. At this time the trunk circuit 175 operates to remove the 60 ground impulses per minute from the EC conductor of the trunk 176 in order to cause the repeater 500 and the associated tone unit 501 to terminate the transmission of the disconnect signal over the toll line 505; whereby the repeater 405 and the associated tone unit 406 respond removing the 60 ground impulses per minute from the EC conductor C424 of the trunk 420 in order to extinguish the front supervisory lamp associated with the cord circuit in use at the toll board 300 indicating to the operator thereat that the operator at the toll board 100 has again answered the call.

In order to release the established connection, the operator at the toll board 300 withdraws the front plug of the cord circuit in use from the jack terminating the trunk 301 effecting the release of the toll line circuit 302, the toll first selector 303, the toll second selector and amplifier 400, the repeaters 405 and 500, the incoming toll selector 600 and the outgoing toll selector 170; all in the manner previously described.

When the outgoing toll selector 170 is thus released, ground potential is removed from the control conductor of the trunk 174 bringing about the release of the toll trunk circuit 175. When the toll trunk circuit 175 is thus released, the busy lamp associated with the jack terminating the trunk 176 at the toll board 100 is extinguished in order to indicate the idle condition of the toll trunk circuit 175 to the operator at the toll board 100. At this time the established connection between the calling toll board 300 in the distant office 10 and the called toll board 100 the central office 20 is released and all of the apparatus involved therein is completely released and available for further use.

*Sect. 5.—Extension of a call from the toll board in the central office to a subscriber substation in the distant office*

The extension of a call from the calling toll board 100 in the central office 20 to a called subscriber substation, such for example, as the subscriber substation T10 in the distant office 10 is fundamentally the same as the extension of a call from the calling toll board 300 in the distant office 10 to the called subscriber substation T20 in the central office 20, as described in Sect. 3. Such a connection may be routed from the calling toll board 100 via the trunk 101, the toll line circuit 102, the toll first selector 103, the trunk 104, the toll second selector and amplifier 105, the incoming trunk 110, the repeater 500, the toll line 505, the repeater 405, the outgoing trunk 407, the incoming toll selector and amplifier 410, the trunk 412, the outgoing toll selector 370, the trunk 371, the toll connector 372, and the subscriber line 373 to the called subscriber substation T10. In setting up this connection, the toll first selector 103 responds to the first digit to select the trunk 104; and the toll second selector and amplifier 105 responds to the second digit to select the trunk 110 extending to the repeater 500 and the paired trunk 120 extending to the balancing network 125. The balancing network 125 is arranged to balance the toll line 505 as previously explained; and the balancing network 106 individual to the toll second selector and amplifier 105 is arranged to balance the local connection back to the toll board 100. Moreover, the effective gain of the toll second selector and amplifier 105 is appropriate to the attenuation of the toll line 505 and to the local connection extending back to the toll board 100. The incoming toll selector and amplifier 410 responds to the third digit to select the trunk 412 extending to the outgoing toll selector 370 and the paired trunk 413 extending to the balancing network 415. The balancing network 415 is arranged to balance the local connection to the called subscriber substation T10; and the balancing network 411 individual to the incoming toll selector and amplifier 410 is arranged to balance the toll line 505. Moreover, the effective gain of the toll second selector and amplifier 410 is appropriate to the attenuation of the toll line 505 and to the local connection extending to the called subscriber substation T10. The outgoing toll selector 370 responds to the fourth digit to select the trunk 371 extending to the toll connector 372; and the toll connector 372 responds to the fifth and sixth digits to select the subscriber line 373 extending to the called subscriber substation T10.

The control, supervision and release of this established connection is the same as that described in Sect. 3.

*Sect. 6.—Extension of a call from the toll board in the central office to the toll board in the distant office*

The extension of a call from the calling toll board 100 in the central office 20 to the called toll board 300 in the distant office 10 is fundamentally the same as that described in Sect. 4. Such a connection may be routed from the calling toll board 100 via the trunk 101, the toll line circuit 102, the toll first selector 103, the trunk 104, the toll second selector and amplifier 105, the incoming trunk 110, the repeater 500, the toll line 505, the repeater 405, the outgoing trunk 407, the incoming toll selector and amplifier 410, the trunk 412, the outgoing toll selector 370, the trunk 374, the toll trunk circuit 375, and the trunk 376 to the called toll board 300; the toll first selector 103, the toll second selector and amplifier 105, the incoming toll selector and amplifier 410 and the outgoing toll selector 370 respectively responding to the first, second, third and fourth digits.

The extension, control, supervision and release of this established connection is the same as that described in Sect. 4.

*Sect. 7.—Extension of a call from the toll board in the remote office to a subscriber substation in the central office*

The extension of a call from the calling toll board 200 in the remote office 30 to a called subscriber substation, such for example, as the subscriber substation T20 in the central office 20 is fundamentally the same as the extension of a call from the calling toll board 300 in the distant office 10 to the called subscriber substation T20 in the central office 20, as described in Sect. 3. Such a connection may be routed from the calling toll board 200 via the trunk 201, the toll line circuit 202, the toll first selector 203, the trunk 204, the toll second selector and amplifier 205, the incoming trunk 210, the repeater 250, the toll line 180, the repeater 150, the outgoing trunk 152, the incoming toll selector and amplifier 153, the trunk 160, the outgoing toll selector 170, the trunk 171, the toll connector 172, and the subscriber line 173 to the called subscriber substation T20. In setting up this connection, the toll first selector 203 responds to the first digit to select the trunk 204; and the toll second selector and amplifier 205 responds to the second digit to select the trunk 210 extending to the repeater 250 and the paired trunk 220 extending to the balancing network 225. The balancing network 225 is arranged to balance the toll line 180 as previously explained; and the balancing network 206 individual to the toll second selector and amplifier 205 is arranged to balance the local connection back to the toll board 200. Moreover, the effective gain of the toll second selector and amplifier 205 is appropriate to the attenuation of the toll line 180 and to the local connection extending back to the toll board 200. The incoming toll selector and amplifier 153 responds to the third digit to select the trunk 160 extending to the outgoing toll selector 170 and the paired trunk 610 extending to the balancing network 615. The balancing network 615 is arranged to balance the local connection to the called subscriber substation T20; and the balancing network 154 individual to the incoming toll selector and amplifier 153 is arranged to balance the toll line 180. Moreover, the gain setting switch in the incoming toll selector and amplifier 153 is set in accordance with the third digit to establish the gain thereof appropriate to the attenuation of the toll line 180 and to the local connection extending to the called subscriber substation T20. The outgoing toll selector 170 responds to the fourth digit to select the trunk 171 extending to the toll connector 172; and the toll connector 172 responds to the fifth and sixth digits to select the subscriber line 173 extending to the called subscriber substation T20.

The control, supervision and release of this established connection is the same as that described in Sect. 3.

*Sect. 8.—Extension of a call from the toll board in the remote office to the toll board in the central office*

The extension of a call from the calling toll board 200 in the remote office 30 to the called toll board 100 in the central office 20 is fundamentally the same as that described in Sect. 4. Such a connection may be routed from the calling toll board 200 via the trunk 201, the toll line circuit 202, the toll first selector 203, the trunk 204, the toll second selector and amplifier 205, the incoming trunk 210, the repeater 250, the toll line 180, the repeater 150, the outgoing trunk 152, the incoming toll selector and amplifier 153, the trunk 160, the outgoing toll selector 170, the trunk 174, the toll trunk circuit 175, and the trunk 176 to the called toll board 100; the toll first selector 203, the toll second selector and amplifier 205, the incoming toll selector and amplifier 153, and the outgoing toll selector 170 respectively responding to the first, second, third and fourth digits.

The extension, control, supervision and release of this established connection is the same as that described in Sect. 4.

*Sect. 9.—Extension of a call from the toll board in the central office to a subscriber substation in the remote office*

The extension of a call from the calling toll board 100 in the central office 20 to a called subscriber substation, such for example, as the subscriber substation T30 in the remote office 30 is fundamentally the same as the extension of a call from the calling toll board 300 in the distant office 10 to the called subscriber substation T20 in the central office 20, as described in Sect. 3. Such a connection may be routed from the calling toll board 100 via the trunk 101, the toll line circuit 102, the toll first selector 103, the trunk 114, the toll second selector and amplifier 115, the incoming trunk 130, the repeater 150, the toll line 180, the repeater 250, the outgoing trunk 252, the incoming toll selector and amplifier 253, the trunk 260, the outgoing toll selector 270, the trunk 271, the toll connector 272, and the subscriber line 273 to the called subscriber substation T30. In setting up this connection, the toll first selector 103 responds to the first digit to select the trunk 114; and the toll second selector and amplifier 115 responds to the second digit to select the trunk 130 extending to the repeater 150 and the paired trunk 140 extending to the balancing network 145. The balancing network 145 is arranged to balance the toll line 180 as previously explained; and the balancing network 116 individual to the toll second selector and amplifier 115 is arranged to balance the local connection back to the toll board 100. Moreover, the effective gain of the toll second selector and amplifier 115 is appropriate to the attenuation of the toll line 180 and to the local connection extending back to the toll board 100. The incoming toll selector and amplifier 253 responds to the third digit to select the trunk 260 extending to the outgoing toll selector 270 and the paired trunk 280 extending to the balancing network 285. The balancing network 285 is arranged to balance the local connection to the called subscriber substation T30; and the balancing network 254 individual to the incoming toll selector and amplifier 253 is arranged to balance the toll line 180. Moreover, the effective gain of the toll second selector and amplifier 253 is appropriate to the attenuation of the toll line 180 and to the local connection extending to the called subscriber substation T30. The outgoing toll selector 270 responds to the fourth digit to select the trunk 271 extending to the toll connector 272; and the toll connector 272 responds to the fifth and sixth digits to select the subscriber line 273 extending to the called subscriber substation T30.

The control, supervision and release of this established connection is the same as that described in Sect. 3.

*Sect. 10.—Extension of a call from the toll board in the central office to the toll board in the remote office*

The extension of a call from the calling toll board 100 in the central office 20 to the called toll board 200 in the remote office 30 is fundamentally the same as that described in Sect. 4. Such a connection may be routed from the calling toll board 100 via the trunk 101, the toll line circuit 102, the toll first selector 103, the trunk 114, the toll second selector and amplifier 115, the incoming trunk 130, the repeater 150, the toll line 180, the repeater 250, the outgoing trunk 252, the incoming toll selector and amplifier 253, the trunk 260, the outgoing toll selector 270, the trunk 274, the toll trunk circuit 275, and the trunk 276 to the called toll board 200; the toll first selector 103, the toll second selector and amplifier 115, the incoming toll selector and amplifier 253 and the outgoing toll selector 270 respectively responding to the first, second, third and fourth digits.

The extension, control supervision and release of this established connection is the same as that described in Sect. 4.

*Sect. 11.—Extension of a call from the toll board in the distant office to a subscriber substation in the remote office*

A call that is to be extended from the toll board 300 in the distant office 10 to a subscriber substation, such for example, as the subscriber substation T30 in the remote office 30, may be first initiated at the toll board 300 by selecting an idle cord circuit thereat and then by inserting the front plug thereof into the jack terminating the trunk 301; whereby the toll first selector 303 is seized over the toll line circuit 302. The toll first selector 303 may respond to the first digit to select the trunk 320 extending to the toll second selector and amplifier 400; and the toll second selector and amplifier 400 may respond to the second digit to select the incoming trunk 420 extending to the repeater 405; whereby the repeater 405 may seize over the toll line 505 the repeater 500, causing the repeater 500 to seize over the outgoing trunk 510 the incoming toll selector and amplifier 600. The incoming toll selector and amplifier 600 responds to the third digit to select the group of trunks, including the trunk 130 and then an idle trunk therein; and also the third digit is registered in the gain setting switch 620. Specifically, the incoming toll selector and amplifier 600 may select the particular trunk 130 extending to the repeater 150 and the paired trunk 140 extending to the balancing network 145. When the incoming toll selector and amplifier 600 selects the trunk 130 extending to the repeater 150, the repeater 150 operates in conjunction with the associated tone unit 151 to send a seizure signal over the toll line 180; whereby the repeater 250 and the associated tone unit 251 respond by completing a loop circuit from the repeater 250 via the outgoing trunk 252 to the incoming toll selector and amplifier 253. Also the repeater 250 operates to mark the incoming trunk 210 as busy to the toll second selectors and amplifiers 205, etc., having access thereto.

Also when the incoming toll selector and amplifier 600 selects the trunk 130 extending to the repeater 150, ground potential in the repeater 500 is applied by way of a first winding of a tandem test relay incorporated therein to the EC conductor C514 of the trunk 510; and battery potential in the repeater 150 is applied by way of a second winding of a tandem test relay therein to the EC conductor C134 of the trunk 130; whereby a series circuit is completed for energizing the first winding of the tandem test relay in the repeater 500 and the second winding of the tandem test relay in the repeater 150 causing the tandem test relays in the respective repeaters 500 and 150 to operate. Upon operating the tandem test relay in the repeater 500 cuts out repeating functions thereof; and upon operating the tandem test relay in the repeater 150 cuts out repeating functions thereof. The repeating functions in the repeaters 500 and 150 are cut out since the repeaters 500 and 150 occupy tandem positions between the terminating repeaters 405 and 250; which last mentioned repeaters exchange supervisory controls as explained more fully hereinafter. The balancing network 678 balances the toll line 505; the balancing network 145 balances the toll line 180; and the balancing network 254 individual to the incoming toll selector and amplifier 253 balances the toll line 180. More specifically, upon operating the tandem test relay in the repeater 150 dries or interrupts the supply of battery current to the loop circuit extending between the repeater 150 and the repeater 500; whereby the repeaters 150 and 500 are switched through. Also the winding of the series relay R660 in the incoming toll selector and amplifier 600 is deenergized causing the latter relay to restore effecting the sequential restoration of the control relays R655 and R650; whereby the switch-through relay R640 is operated. Accordingly, the repeating coil 690, as well as the two transformers 691 and 692 and two amplifiers 693 and 694, are inserted in the connection between the repeaters 500 and 150. Moreover, since the gain switch 620 in the incoming toll selector and amplifier 600 has been operated in accordance with the third digit, the wiper 621 thereof has selected a corresponding one of the resistors 626 in shunt relation with the fifth or driving winding of the transformer 691 in order to establish the effective gain of the amplifier 694 appropriate to the toll line 505. Likewise, the wiper 622 of the gain setting switch 620 has selected a corresponding one of the resistors 627 in shunt relation with the fifth or driving winding of the transformer 692 in order to establish the effective gain of the amplifier 693 appropriate to the toll line 180.

When the operator at the toll board 300 then dials the fourth digit, the repeater 405 and the associated tone unit 406 respond sending a corresponding dialing signal over the toll line 505. While this dialing signal is received by the repeater 500 and the associated tone unit 501, they do not respond thereto as repeating functions in the repeater 500 have been cut out by operation of the tandem test relay incorporated therein as previously explained; whereby the dialing signal mentioned passes through the repeater 500 and over the trunk 510 into the first and second windings of the repeating coil 690. The third and fourth windings of the repeating coil 690 are coupled to the first and second windings thereof and are connected to the first, second and third, fourth windings of the transformer 691 and thence to the balancing network 678; whereby the dialing signal is impressed upon the input circuit of the amplifier 693, and the amplified dialing signal from the output circuit of the amplifier 693 is impressed upon the fifth or driving winding of the transformer 692. Accordingly, the amplified dialing signal generated in the first and third windings of the transformer 692 is impressed via the connection, including the balancing network 145, upon the line conductors C131 and C132 of the trunk 130 extending to the repeater 150. While this amplified dialing signal is received by the repeater 150 and the associated tone unit 151, they do not respond thereto as repeating functions in the repeater 150 have been cut out by operation of the tandem test relay incorporated therein as previously explained; whereby the amplified dialing signal mentioned passes through the repeater 150 and over the toll line 180. The dialing signal mentioned is received by the repeater 250 and the associated tone unit 251; whereby they respond causing a corresponding series of impulses to be transmitted over the loop circuit extending via the trunk 252 between the repeater 250 and the incoming toll selector and amplifier 253; whereby the incoming toll selector and amplifier 253 is operated in accordance with the fourth digit. The incoming toll selector and amplifier 253 may respond to the fourth digit to select the trunk 260 extending to the outgoing toll selector 270 and to select the paired trunk 280 extending to the balancing network 285. The balancing network 254 individual to the incoming toll selector and amplifier 253 balances the toll line 180; while the balancing network 285 balances the local connection to the called subscriber substation T30 in the remote office 30. The fifth, sixth, and seventh digits dialed at the calling toll board 300 are received by the repeater 405 and the associated tone unit 406; whereby corresponding dialing signals are sent thereby over the toll line 505; which dialing signals are amplified by the arrangement including the amplifier 693 incorporated in the incoming toll selector and amplifier 600 and impressed via the repeater 150 upon the toll line 180 and consequently upon the repeater 250 and the associated tone unit 251. The repeaters 500 and 150 do not respond to the dialing signals mentioned as previously explained. The repeater 250 and the associated tone unit 251 respond to the fifth, sixth and seventh dialing signals repeating corresponding series of impulses over the trunk 252; whereby the outgoing toll selector 270 is operated in accordance with the fifth digit. The outgoing toll selector 270 may respond to the fifth digit to select the trunk 271 extending to the toll connector 272. Then the toll connector 272 responds to the sixth and seventh digits to select the subscriber line 273 extending to the called subscriber substation T30.

The subsequent operation of the toll connector 272 depends upon the idle or busy condition of the called subscriber substation T30 at this time; all in the manner described in Sect. 3. Assuming that the called subscriber substation T30 is idle at this time, the toll connector 272 operates to dry or interrupt the supply of battery current to the loop circuit extending back to the repeater 250 and to apply ground potential to the EC conductor of the trunk 271; whereby the repeater 250 operates to apply a splash of battery potential to the positive line conductor of the trunk 252 and consequently to the positive line conductor of the trunk 271 in order to initiate a ringing cycle of the toll connector 272. Specifically, the toll connector 272 operates to project ringing current over the subscriber line 273 in order to operate the ringer at the called subscriber substation T30. When the loop circuit extending between the toll connector 272 and the repeater 250 is thus dried, the incoming toll selector and amplifier 253 is switched through; also the repeater 250 operates in conjunction with the associated tone unit 251 to send an end-of-dialing signal over the toll line 180. The repeater 150 and the associated tone unit 151 do not respond to the end-of-dialing signal since repeating functions in the repeater 150 have been cut out as previously explained; whereby the dialing signal passes through the repeater 150 via the trunk 130 and through the first, second and third, fourth windings of the transformer 692 in the incoming toll selector and amplifier 600 into the balancing network 145. This end-of-dialing signal is amplified by the amplifier 694 and impressed upon the fifth or driving winding of the transformer 691; whereby the amplified end-of-dialing signal is impressed upon the third and fourth windings of the repeating coil 690 generating a corresponding end-of-dialing signal in the first and second windings thereof that is impressed upon the trunk 510. While this amplified end-of-dialing signal is received by the repeater 500 and the associated tone unit 501, they do not respond thereto since repeating functions in the repeater 500 have been cut out as previously explained; whereby the end-of-dialing signal traverses the repeater 500 and is impressed upon the toll line 505. The repeater 405 and the associated tone unit 406 respond to the end-of-dialing signal completing a monitoring connection between the line conductors of the toll line 505 and the line conductors C421 and C422 of the trunk 420. Also the repeater 405 switches through drying or interrupting the supply of battery current to the loop circuit extending thereto from the toll board 300 and applying ground potential to the EC conductor C424 of the trunk 420 and consequently to the EC conductor C324 of the trunk 320; whereby the front supervisory lamp associated with the cord circuit in use at the toll board 300 is illuminated indicating to the operator thereat that the toll connector in use has selected the subscriber line 273 extending to the called subscriber substation T30 in the remote office 30. When the loop circuit extending between the repeater 405 and the toll board 300 is thus dried, the winding of the series relay R460 in the toll second selector and amplifier 400 is deenergized; whereby the latter relay restores in order to effect the sequential restoration of the control relays R455 and R450 and the consequent operation of the switch-through relay R440. Accordingly, at this time the amplifying arrangement in the toll second selector and amplifier 400 is inserted in the connection between the calling toll board 300 and the repeater 405; the amplifying arrangement in the incoming toll selector and amplifier 600 is already included in the connection between the repeaters 500 and 150; and the amplifying arrangement in the incoming toll selector and amplifier 253 is inserted in the connection between the repeater 250 and the toll connector 272.

When the subscriber at the called subscriber substation T30 answers the call, the toll connector 272 operates to arrest the projection of ringing current over the subscriber line 273 and to remove the application of ground potential upon the EC conductor of the trunk 271; whereby the repeater 250 and the associated tone unit 251 respond to send an answer signal over the toll line 180. The repeater 150 and the tone unit 151 do not respond to the answer signal; however, the answer signal is amplified in the amplifier arrangement incorporated in the incoming toll selector and amplifier 600 and impressed through the repeater 500 upon the toll line 505. The repeater 500 and the associated tone unit do not respond to the answer signal; however, the repeater 405 and the associated tone unit 406 respond to the answer signal in order to interrupt the application of ground potential upon the EC conductor C424 of the trunk 420 and consequently upon the EC conductor C324 of the trunk 320 in order to extinguish the front supervisory lamp associated with the cord circuit in use at the calling toll board 300 in order to indicate to the operator thereat that the call has been answered at the called subscriber substation T30. Also at this time the repeater 405 switches through; whereby a communication connection is completed between the calling toll board 300 in the distant office 10 and the called subscriber substation T30 in the remote office 30.

This established connection includes the amplifying arrangements in the toll second selector and amplifier 400, in the incoming toll selector and amplifier 600 and in the incoming toll selector and amplifier 253 as previously explained.

At the conclusion of the established connection, when the subscriber at the called subscriber substation T30 disconnects, the toll connector 272 responds to apply 60 ground impulses per minute to the EC conductor of the trunk 271; whereby the repeater 250 and the associated tone unit 251 respond to send the disconnect signal over the toll line 180. The repeater 150 and the associated tone unit 151 do not respond to the disconnect signal; however, the disconnect signal is amplified in the incoming toll selector and amplifier 600 and impressed through the repeater 500 upon the toll line 505. The repeater 500 and the associated tone unit 501 do not respond to the disconnect signal; however, the repeater 405 and the associated tone unit 406 respond to the disconnect signal, the repeater 405 repeating 60 ground impulses per minute over the EC conductor C424 of the trunk 420 and consequently over the EC conductor C324 of the trunk 320 in order to flash 60 times per minute the front supervisory lamp associated with the cord circuit in use at the toll board 300 indicating to the operator thereat that the subscriber at the called subscriber substation T30 has disconnected at this time. The operator at the calling toll board 300 may disconnect effecting the release of the connection or she may re-ring the subscriber at the called subscriber substation T30.

First assuming that the operator at the calling toll board 300 wishes to re-ring the subscriber at the called subscriber substation T30, the ring key at the toll board 300 is momentarily operated effecting operation of the ring relay R465 in the manner previously explained; whereby a splash of battery potential is connected to the positive line conductor C422 of the trunk 420 extending to the repeater 405. The repeater 405 and the associated tone unit 406 respond to transmit a re-ring signal over the connection which re-ring signal is effectively received by the repeater 250 and the associated tone unit 251, the operations of the apparatus incorporated between the repeaters 405 and 250 being the same as that previously described; whereby the repeater 250 controls the incoming toll selector and amplifier 253 causing a splash of battery potential to be applied to the positive line conductor of the trunk 260 and consequently to the positive line conductor of the trunk 271 in order to initiate another ringing cycle of the toll connector 272. More particularly, the toll connector 272 operates to project ringing current over the subscriber line 273 to the called subscriber substation T30; and when the subscriber at the called subscriber substation T30 reanswers the call, the toll connector 272 operates to arrest the projection of ringing current over the subscriber line 273 and to remove the 60 ground impulses per minute from the EC conductor of the trunk 271. The repeater 250 and the associated tone unit 251 respond terminating the transmission of the disconnect signal over the toll line 180; whereby the repeater 405 and the associated tone unit 406 respond interrupting the application of 60 ground impulses per minute to the EC conductor C424 of the trunk 420 and consequently from the EC conductor C324 of the trunk 320; whereby flashing of the front supervisory lamp associated with the cord circuit in use at the calling toll board 300 is arrested indicating to the operator thereat that the call has been reanswered at the called subscriber substation T30.

Upon receiving the disconnect signal, the operator at the calling toll board 300 may disconnect by withdrawing the front plug of the cord circuit in use from the jack terminating the trunk 301 in order to effect the release of the toll line circuit 302, the toll first selector 303 and the toll second selector and amplifier 400 in the manner explained in Sect. 3. When the toll second selector and amplifier 400 is thus released, the repeater 405 and the associated tone unit 406 operate to transmit the release signal over the toll line 505. Since the release signal constitutes a long splash of 60 cycle modulated 1000 cycle current, the repeater 500 and the associated tone unit 501, as well as the repeater 150 and the associated tone unit 151, respond thereto; and of course, the repeater 250 and the associated tone unit 251 respond to the release signal.

First the repeater 405 and the associated tone unit 406 send the release signal over the toll line 505, and are then released; and the repeater 500 and the associated tone unit 501 respond to the release signal to bring about the release thereof as well as the release of the incoming toll selector and amplifier 600. The repeater 250 and the associated tone unit 251 respond to the release signal and are released and bring about the release of the incoming toll selector and amplifier 253, the outgoing toll selector 270 and the toll connector 272. Also the repeater 150 and the associated tone unit 151 respond to the release signal to bring about the release thereof; and incident to the release of the repeater 150, the repeater 150 and the associated tone unit 151 operate to retransmit the release signal over the toll line 180, thereby positively to insure the release of the repeater 250 and the associated tone unit 251. Normally the repeater 250 and the associated tone unit 251 are released incident to the reception of the release signal from the repeater 405 and the associated tone unit 406. However, the release signal is again received by the repeater 250 and the associated tone unit 251 in order positively to insure the release of the repeater 250 and the associated tone unit 251. At this time the established connection between the calling toll board 300 in the distant office 10 and the called subscriber substation T30 in the remote office 30 is released, and all of the apparatus incorporated therein is completely released and available for further use.

*Sect. 12.—Extension of a call from the toll board in the distant office to the toll board in the remote office*

The extension of a call from the calling toll board 300 in the distant office 10 to the called toll board 200 in the remote office 30 is fundamentally the same as the extension of a call from the calling toll board 300 in the distant office 10 to the called subscriber substation T30 in the remote office 30 described in Sect. 11. Such a connection may be routed from the calling toll board 300 in the distant office 10 to the called toll board 200 in the remote office 30 via the trunk 301, the toll line circuit 302, the toll first selector 303, the trunk 320, the toll second selector and amplifier 400, the trunk 420, the repeater 405, the toll line 505, the repeater 500, the trunk 510, the incoming toll selector and amplifier 600, the trunk 130, the repeater 150, the toll line 180, the repeater 250, the trunk 252, the incoming toll selector and amplifier 253, the trunk 260, the outgoing toll selector 270, the trunk 274, the toll trunk circuit 275, and the trunk 276. When this connection is established, the repeater 405 and the associated tone unit 406 exchange supervisory and control signals with the repeater 250 and the associated tone unit 251; repeating functions in the repeater 500 and the associated tone unit 501 and in the repeater 150 and the associated tone unit 151 being cut out, although the repeater 500 and the associated tone unit 501 and the repeater 150 and the associated tone unit 151 respond to a release signal; all in the manner previously explained. Also this established connection includes the amplifying arrangements in the toll second selector and amplifier 400, the incoming toll selector and amplifier 600 and the incoming toll selector and amplifier 253.

*Sect. 13.—Extension of a call from the toll board in the remote office to a subscriber substation in the distant office*

The extension of a call from the calling toll board 200 in the remote office 30 to a called subscriber substation, such for example as the subscriber substation T10 in the distant office 10, is fundamentally the same as the extension of a call from the calling toll board 300 in the distant office 10 to the called subscriber substation T30 in the remote office 30 described in Sect. 11. Such a connection may be routed from the calling toll board 200 in the remote office 30 to the called subscriber substation T10 in the distant office 10 via the trunk 201, the toll line circuit 202, the toll first selector 203, the trunk 204, the toll second selector and amplifier 205, the trunk 210, the repeater 250, the toll line 180, the repeater 150, the trunk 152, the incoming toll selector and amplifier 153, the trunk 110, the repeater 500, the toll line 505, the repeater 405, the trunk 407, the incoming toll selector and amplifier 410, the trunk 412, the outgoing toll selector 370, the trunk 371, the toll connector 372, and the subscriber line 373. When this connection is established, the repeater 250 and the associated tone unit 251 exchange supervisory and control signals with the repeater 405 and the associated tone unit 406; repeating functions in the repeater 150 and the associated tone unit 151 and in the repeater 500 and the associated tone unit 501 being cut out, although the repeater 150 and the associated tone unit 151 and the repeater 500 and the associated tone unit 501 respond to a release signal; all in the manner previously explained. Also this established connection includes the amplifying arrangements in the toll second selector and amplifier 205, the incoming toll selector and amplifier 153 and the incoming toll selector and amplifier 410.

*Sect. 14.—Extension of a call from the toll board in the remote office to the toll board in the distant office*

The extension of a call from the calling toll board 300 in the remote office 30 to the called toll board 200 in the distant office 10 is fundamentally the same as the extension of a call from the calling toll board 300 in the distant office 10 to the called toll board 200 in the remote office 30 described in Sect. 12. Such a connection may be routed from the calling toll board 200 in the remote office 30 to the called toll board 300 in the distant office 10 via the trunk 201, the toll line circuit 202, the toll first selector 203, the trunk 204, the toll second selector and amplifier 205, the trunk 210, the repeater 250, the toll line 180, the repeater 150, the trunk 152, the incoming toll selector and amplifier 153, the trunk 110, the repeater 500, the toll line 505, the repeater 405, the trunk 407, the incoming toll selector and amplifier 410, the trunk 412, the outgoing toll selector 370, the trunk 374, the toll trunk circuit 375, and the trunk 376. When this connection is established, the repeater 250 and the associated tone unit 251 exchange supervisory and control signals with the repeater 405 and the associated tone unit 406; repeating functions in the repeater 150 and the associated tone unit 151 and in the repeater 500 and the associated tone unit 501 being cut out, although the repeater 150 and the associated tone unit 151 and the repeater 500 and the associated tone unit 501 respond to a release signal; all in the manner previously explained. Also this established connection includes the amplifying arrangements in the toll second selector and amplifier 205, the incoming toll selector and amplifier 153, and the incoming toll selector and amplifier 410.

*Sect. 15.—Conclusions*

In view of the foregoing it is apparent that a toll switching telephone system has been provided that comprises an improved combination numerical switch and amplifier that insures the required signal gain between the various lines and trunks involved in an established connection.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, an incoming trunk, a plurality of lines, an automatic switch comprising a line relay normally connected to said incoming trunk, switching mechanism having access to said lines, a switch relay, an amplifier, a switch-through relay, means including said line relay responsive to a digit transmitted over said incoming trunk for selectively operating said switching mechanism to select one of said lines, means responsive to operation of said switching mechanism to select one of said lines for operating said switch relay, means responsive to operation of said switch relay for disconnecting said line relay from said incoming trunk and for connecting said incoming trunk to said switching mechanism and thus to said one line, means responsive to a control received over said one line for operating said switch-through relay, and means responsive to operation of said switch-through relay for inserting said amplifier in said connection between said incoming trunk and said switching mechanism.

2. In a telephone system, an incoming trunk, a plurality of lines, an automatic switch comprising a line relay normally connected to said incoming trunk, switching mechanism having access to said lines, a switch relay, an amplifier, a switch-through relay, means including said line relay responsive to a digit transmitted over said incoming trunk for selectively operating said switching mechanism to select one of said lines, means responsive to operation of said switching mechanism to select one of said lines for operating said switch relay, means responsive to operation of said switch relay for disconnecting said line relay from said incoming trunk and for completing a metallic connection between said incoming trunk and said switching mechanism and thus to said one line, means responsive to a control received over said one line for operating said switch-through relay, and means responsive to operation of said switch-through relay for interrupting said metallic connection and for connecting said amplifier between said incoming trunk and said switching mechanism.

3. In a telephone system, an incoming trunk, a plurality of lines, an automatic switch comprising a line relay normally connected to said incoming trunk, switching mechanism having access to said lines, a switch relay, a series relay provided with a winding, an amplifier, means including said line relay responsive to a digit transmitted over said incoming trunk for selectively operating said switching mechanism to select one of said lines, means responsive to operation of said switching mechanism to select one of said lines for operating said switch relay, means responsive to operation of said switch relay for disconnecting said line relay from said incoming trunk and for completing a first connection via the winding of said series relay between said incoming trunk and said switching mechanism and thus to said one line, means initially completing and subsequently interrupting a circuit via the winding of said series relay so that said series relay is operated and subsequently restored, and means responsive to operation and subsequent restoration of said series relay for interrupting said first connection and for completing a second connection via said amplifier between said incoming trunk and said switching mechanism and thus to said one line.

4. In a telephone system, an incoming trunk, an automatic switch including switching mechanism, an amplifier, a gainsetting switch selectively operative to set the signal gain of said amplifier, a line relay normally connected to said incoming trunk, means including said line relay responsive to a digit transmitted over said incoming trunk for selectively operating said switching mechanism and for simultaneously selectively operating said gainsetting switch, a switch relay, means controlled by operation of said switching mechanism for operating said switch relay, a switchthrough relay, means controlled by operation of said switch relay for disconnecting said line relay from said incoming trunk and for completing a connection from said incoming trunk via said switchthrough relay to said switching mechanism, and means controlled by said switchthrough relay for inserting said amplifier between said incoming trunk and said switching mechanism.

5. In a telephone system, an incoming trunk, a plurality of lines, an automatic switch including switching mechanism having access to said lines, first and second one-way amplifiers, a gainsetting switch, a line relay normally connected to said incoming trunk, means including said line relay responsive to a digit transmitted over said incoming trunk for selectively operating said switching mechanism to select one of said lines and for simultaneously selectively operating said gainsetting switch, means controlled by the selective operation of said gainsetting switch for setting the signal gain of said first amplifier appropriate to a signal from said incoming trunk to said one line and for setting the signal gain of said second amplifier appropriate to a signal from said one line to said incoming trunk, a switch relay, means controlled by operation of said switching mechanism for operating said switch relay, a switchthrough relay, means controlled by operation of said switch relay for disconnecting said line relay from said incoming trunk and for completing a connection from said incoming trunk via said switchthrough relay to said switch mechanism, and means controlled by said switch relay for inserting said first and second amplifiers between said incoming trunk and said switching mechanism.

6. In a telephone system, an incoming trunk, groups of lines, an automatic switch comprising a line relay normally connected to said incoming trunk, switching mechanism having access to said groups of lines, an amplifier having different signal gain settings corresponding to said groups of lines, a switch relay, a switch-through relay, means including said line relay responsive to a digit received over said incoming trunk for operating said switching mechanism to select the corresponding one of said groups of lines and for simultaneously selecting the corresponding one of said signal gain settings of said amplifier, additional means for operating said switching mechanism to select a line in said one group of lines, means responsive to operation of said switching mechanism to select one of said lines for operating said switch relay, means responsive to operation of said switch relay for disconnecting said line relay from said incoming trunk and for connecting said incoming trunk to said switching mechanism and thus to said one line, means responsive to a control received over said one line for operating said switch-through relay, and means responsive to operation of said switch-through relay for inserting said amplifier in said connection between said incoming trunk and said switching mechanism.

7. In a telephone system, a calling station, an automatic switch provided with an incoming trunk and a line relay normally connected to said incoming trunk and a first balancing network and a switching mechanism, a plurality of lines accessible to said switching mechanism, a plurality of second balancing networks individually associated with said lines and accessible to said switching mechanism, an amplifier, means for connecting said calling station to said incoming trunk, means including said line relay responsive to a digit transmitted from said calling station over said incoming trunk for selectively operating said switching mechanism to select one of said lines and the corresponding one of said second balancing networks, means for disconnecting said line relay from said incoming trunk and for connecting said incoming trunk to said switching mechanism and thus to said one line, and means responsive to a control received over said one line for disconnecting said incoming trunk from said one line and for completing a first operative connection between said incoming trunk and said first balancing network and for completing a second operative connection between said one line and said one second balancing network and for operatively connecting said amplifier between said first and second connections.

JOHN WICKS.

REFERENCES CITED

The following references are of record in the file of this patent:

UNITED STATES PATENTS

| Number | Name | Date |
|---|---|---|
| 1,635,227 | Shackleton et al. | July 12, 1927 |
| 1,647,286 | Fisher | Nov. 1, 1927 |
| 1,647,796 | Glezen et al. | Nov. 1, 1927 |
| 1,795,494 | Kusche et al. | Mar. 10, 1931 |
| 2,025,145 | Bascom et al. | Dec. 24, 1935 |
| 2,311,774 | Peterson et al. | Feb. 23, 1943 |
| 2,398,854 | Ray | Apr. 23, 1946 |
| 2,421,034 | McKim | May 27, 1947 |

FOREIGN PATENTS

| Number | Country | Date |
|---|---|---|
| 443,220 | Great Britain | Feb. 24, 1936 |